(12) United States Patent
Islam et al.

(10) Patent No.: US 11,184,848 B2
(45) Date of Patent: Nov. 23, 2021

(54) CONNECTED DISCONTINUOUS RECEPTION WAKE UP PROCEDURE

(71) Applicant: QUALCOMM Incorporated, San Diego, CA (US)

(72) Inventors: Muhammad Nazmul Islam, Edison, NJ (US); Sumeeth Nagaraja, San Diego, CA (US); Jianghong Luo, Skillman, NJ (US); Sundar Subramanian, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/032,742

(22) Filed: Jul. 11, 2018

(65) Prior Publication Data

US 2019/0053153 A1    Feb. 14, 2019

Related U.S. Application Data

(60) Provisional application No. 62/544,739, filed on Aug. 11, 2017.

(51) Int. Cl.
*H04W 52/02* (2009.01)
*H04B 7/06* (2006.01)
(Continued)

(52) U.S. Cl.
CPC ...... *H04W 52/0216* (2013.01); *H04B 7/0617* (2013.01); *H04B 7/0626* (2013.01);
(Continued)

(58) Field of Classification Search
CPC ... H04W 72/042; H04W 76/02; H04W 36/00; H04W 74/0833; H04W 16/28;
(Continued)

(56) References Cited

U.S. PATENT DOCUMENTS

2010/0238824 A1* 9/2010 Farajidana ........... H04B 7/0417
370/252
2011/0243261 A1* 10/2011 Bienas .............. H04W 72/1215
375/260

(Continued)

FOREIGN PATENT DOCUMENTS

WO    WO2017167755 A1    10/2017
WO    WO2017197642 A1    11/2017

OTHER PUBLICATIONS

International Search Report and Written Opinion—PCT/US2018/042320—ISA/EPO—Oct. 18, 2018.

(Continued)

*Primary Examiner* — Melanie Jagannathan
(74) *Attorney, Agent, or Firm* — Holland & Hart LLP

(57) ABSTRACT

Methods, systems, and devices for wireless communication are described. A base station may identify that data is available to be transmitted to a user equipment (UE) that is operating in a discontinuous reception (DRX) mode. The base station may configure a plurality of UE-specific reference signals for transmission to the UE, each UE-specific reference signal indicating a UE identifier and an availability of data for the UE. The UE may receive the UE-specific reference signal, and identify that data is available for the UE from the base station. The UE may then transmit a beam recovery signal to the base station that includes an identifier for the transmit beam used by the UE to transmit the beam recovery signal. The base station may transmit, using a beam sweeping configuration, the plurality of UE-specific reference signals.

26 Claims, 16 Drawing Sheets

(51) Int. Cl.
*H04B 7/08* (2006.01)
*H04W 76/28* (2018.01)
*H04L 5/00* (2006.01)
*H04W 16/28* (2009.01)
*H04W 72/04* (2009.01)

(52) U.S. Cl.
CPC .......... *H04B 7/0695* (2013.01); *H04B 7/088* (2013.01); *H04L 5/0051* (2013.01); *H04W 16/28* (2013.01); *H04W 72/0406* (2013.01); *H04W 76/28* (2018.02); *H04L 5/005* (2013.01); *H04L 5/0057* (2013.01)

(58) Field of Classification Search
CPC ......... H04W 52/0216; H04W 72/0406; H04W 76/28; H04B 7/0617; H04B 7/0626
See application file for complete search history.

(56) References Cited

U.S. PATENT DOCUMENTS

| | | | | |
|---|---|---|---|---|
| 2012/0275366 | A1* | 11/2012 | Anderson | H04W 52/0219 370/311 |
| 2014/0036747 | A1* | 2/2014 | Nory | H04W 74/0833 370/311 |
| 2015/0003311 | A1* | 1/2015 | Feuersaenger | H04W 52/0225 370/311 |
| 2017/0127325 | A1* | 5/2017 | Vikberg | H04W 36/14 |
| 2017/0181219 | A1 | 6/2017 | Cano et al. | |
| 2017/0251518 | A1* | 8/2017 | Agiwal | H04W 24/08 |
| 2017/0311342 | A1* | 10/2017 | You | H04B 7/0695 |
| 2017/0325167 | A1* | 11/2017 | Lu | H04W 52/0229 |
| 2017/0339675 | A1* | 11/2017 | Liu | H04L 5/0051 |
| 2018/0092073 | A1 | 3/2018 | Nogami et al. | |
| 2018/0092129 | A1* | 3/2018 | Guo | H04L 5/0048 |
| 2018/0097598 | A1 | 4/2018 | Ang et al. | |
| 2018/0167883 | A1* | 6/2018 | Guo | H04W 76/27 |
| 2018/0227094 | A1* | 8/2018 | Liu | H04L 5/0025 |
| 2018/0227898 | A1* | 8/2018 | Noh | H04B 7/02 |
| 2018/0270894 | A1* | 9/2018 | Park | H04W 76/27 |
| 2018/0288746 | A1* | 10/2018 | Zhang | H04L 1/0031 |
| 2019/0013842 | A1* | 1/2019 | Xiong | H04B 7/0408 |
| 2019/0037498 | A1* | 1/2019 | Tseng | H04W 52/0238 |
| 2019/0052334 | A1* | 2/2019 | Jeon | H04B 7/0626 |
| 2019/0058518 | A1* | 2/2019 | Koskela | H04B 7/0617 |
| 2019/0059096 | A1* | 2/2019 | Wang | H04W 72/0413 |
| 2019/0059129 | A1* | 2/2019 | Luo | H04W 72/042 |
| 2019/0149306 | A1* | 5/2019 | Gao | H04L 1/0026 |
| 2019/0182784 | A1* | 6/2019 | Harada | H04B 7/04 |
| 2019/0223094 | A1* | 7/2019 | Ingale | H04W 48/16 |
| 2019/0239189 | A1* | 8/2019 | Hwang | H04W 68/02 |

OTHER PUBLICATIONS

Qualcomm Incorporated: "Beam Management and C-DRX Operation", 3GPP Draft; R2-1706911 Beam Management and DRX, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27-29, 2017 Jun. 26, 2017, XP051301408, Retrieved from the Internet: URL:http://www.3gpp.org/ftp/Meetings_3GPP_SYNC/RAN2/ [retrieved on Jun. 26, 2017], 3 pages.

Qualcomm Incorporated: "Paging Design Consideration", 3GPP Draft; R1-1708573 Paging Design Consideration, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15-19, 2017 May 14, 2017, XP051273766, Retrieved from the Internet: URL:http://www.3gpp.org/ftp/Meetings_3GPP_SYNC/RAN1/Docs/ [retrieved on May 14, 2017], 6 pages.

* cited by examiner

CONNECTED DISCONTINUOUS RECEPTION WAKE UP PROCEDURE

CROSS REFERENCES

The present Application for Patent claims the benefit of U.S. Provisional Patent Application No. 62/544,739 by ISLAM, et al., entitled "CONNECTED DISCONTINUOUS RECEPTION WAKE UP PROCEDURE," filed Aug. 11, 2017, assigned to the assignee hereof, and expressly incorporated herein.

BACKGROUND

The following relates generally to wireless communication, and more specifically to a connected discontinuous reception (C-DRX) wake up procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an active state (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH). The PDCCH may carry or otherwise convey an indication that the base station has data ready to transmit to the UE. In a mmW wireless communication system, the mmW base station (e.g., a next generation nodeB (gNB)) may need to beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support a connected discontinuous reception (C-DRX) wake up procedure. Generally, the described techniques provide for a base station to convey some or all of the user equipment (UE) identifier, e.g., a cell radio temporary identifier (C-RNTI), of the UE using a reference signal. For example, the base station may determine or otherwise identify that data is available for transmission to the UE and that the UE is operating in a DRX (e.g., C-DRX) mode. For example, the UE may be operating in a DRX mode that includes transitioning between an active state (or on duration) and a sleep state. The base station may determine that data is available for the UE and, when the UE transitions to an active state, configure and transmit a plurality of UE-specific reference signals (e.g., channel state information reference signals (CSI-RSs)) to the UE. The UE-specific reference signals may carry or otherwise convey an indication of the UE identifier (e.g., may be encoded with some or all of the UE identifier). The base station may beam sweep the plurality of UE-specific reference signals to the UE. The UE may receive UE-specific reference signals and determine or otherwise identify that data is available for the UE. For example, the UE may decode the reference signals using the identifier of the UE to identify that the data is available. When data is available for the UE, the UE may respond by transmitting a beam recovery signal to the base station. In some aspects, the UE may configure the beam recovery signal to carry or otherwise convey an indication of the transmit beam used by the UE to transmit the beam recovery signal. In other aspects, the UE may configure the beam recovery signal to carry or otherwise convey an indication (e.g., a beam index) of a base station transmit beam that the UE has selected for use in communications with the UE, e.g., the transmit beam index from the plurality of UE-specific reference signals having the highest receive power level, the lowest interference level, and the like.

A method of wireless communication is described. The method may include identifying that data is available to be transmitted a UE that is operating in a DRX mode, the DRX mode comprising a sleep state and an active state, configuring a plurality of UE-specific reference signals for transmission to the UE, each UE-specific reference signal indicating a UE identifier and an availability of data for the UE, and transmitting, using a beam sweeping configuration, the plurality of UE-specific reference signals.

An apparatus for wireless communication is described. The apparatus may include means for identifying that data is available to be transmitted a UE that is operating in a DRX mode, the DRX mode comprising a sleep state and an active state, means for configuring a plurality of UE-specific reference signals for transmission to the UE, each UE-specific reference signal indicating a UE identifier and an availability of data for the UE, and means for transmitting, using a beam sweeping configuration, the plurality of UE-specific reference signals.

Another apparatus for wireless communication is described. The apparatus may include a processor, memory in electronic communication with the processor, and instructions stored in the memory. The instructions may be operable to cause the processor to identify that data is available to be transmitted a UE that is operating in a DRX mode, the DRX mode comprising a sleep state and an active state, configure a plurality of UE-specific reference signals for transmission to the UE, each UE-specific reference signal indicating a UE identifier and an availability of data for the UE, and transmit, using a beam sweeping configuration, the plurality of UE-specific reference signals.

A non-transitory computer readable medium for wireless communication is described. The non-transitory computer-readable medium may include instructions operable to cause a processor to identify that data is available to be transmitted a UE that is operating in a DRX mode, the DRX mode comprising a sleep state and an active state, configure a plurality of UE-specific reference signals for transmission to the UE, each UE-specific reference signal indicating a UE identifier and an availability of data for the UE, and transmit, using a beam sweeping configuration, the plurality of UE-specific reference signals.

In some examples of the method, apparatus, and non-transitory computer-readable medium described above, configuring the plurality of UE-specific reference signals for transmission to the UE comprises: encoding a plurality of CSI-RSs with at least a portion of the UE identifier.

In some examples of the method, apparatus, and non-transitory computer-readable medium described above, configuring the plurality of UE-specific reference signals for transmission to the UE comprises: encoding the plurality of UE-specific reference signals with at least a portion of a cell radio network temporary identifier (C-RNTI) for the UE. In some examples of the method, apparatus, and non-transitory computer-readable medium described above, transmitting the plurality of UE-specific reference signals conveys the indication of availability of data for the UE.

Some examples of the method, apparatus, and non-transitory computer-readable medium described above may further include processes, features, means, or instructions for configuring a bit in the plurality of UE-specific reference signals to indicate that the data may be available for transmission to the UE.

Some examples of the method, apparatus, and non-transitory computer-readable medium described above may further include processes, features, means, or instructions for receiving a beam recovery signal from the UE in response to the plurality of UE specific reference signals. Some examples of the method, apparatus, and non-transitory computer-readable medium described above may further include processes, features, means, or instructions for selecting a transmit beam to use to transmit the data to the UE based at least in part on the received beam recovery signal.

Some examples of the method, apparatus, and non-transitory computer-readable medium described above may further include processes, features, means, or instructions for receiving a beam recovery signal from the UE in response to the plurality of UE specific reference signals. Some examples of the method, apparatus, and non-transitory computer-readable medium described above may further include processes, features, means, or instructions for identifying a beam index for a transmit beam used by the UE to transmit the beam recovery signal.

Some examples of the method, apparatus, and non-transitory computer-readable medium described above may further include processes, features, means, or instructions for transmitting the data to the UE based at least in part on the identified beam index.

In some examples of the method, apparatus, and non-transitory computer-readable medium described above, the beam sweeping configuration comprises transmitting each UE-specific reference signal in a different beamforming direction.

A method of wireless communication is described. The method may include receiving, while operating in a DRX mode, a UE-specific reference signal from a base station, identifying, based at least in part on the received UE-specific reference signal, that data for the UE is available from the base station, and transmitting, based at least in part on the identification, a signal to the base station, the signal including a beam index.

An apparatus for wireless communication is described. The apparatus may include means for receiving, while operating in a DRX mode, a UE-specific reference signal from a base station, means for identifying, based at least in part on the received UE-specific reference signal, that data for the UE is available from the base station, and means for transmitting, based at least in part on the identification, a signal to the base station, the signal including a beam index.

Another apparatus for wireless communication is described. The apparatus may include a processor, memory in electronic communication with the processor, and instructions stored in the memory. The instructions may be operable to cause the processor to receive, while operating in a DRX mode, a UE-specific reference signal from a base station, identify, based at least in part on the received UE-specific reference signal, that data for the UE is available from the base station, and transmit, based at least in part on the identification, a signal to the base station, the signal including a beam index.

A non-transitory computer readable medium for wireless communication is described. The non-transitory computer-readable medium may include instructions operable to cause a processor to receive, while operating in a DRX mode, a UE-specific reference signal from a base station, identify, based at least in part on the received UE-specific reference signal, that data for the UE is available from the base station, and transmit, based at least in part on the identification, a signal to the base station, the signal including a beam index.

In some examples of the method, apparatus, and non-transitory computer-readable medium described above, identifying that the data for the UE may be available comprises: decoding a CSI-RS using at least a portion of an identifier of the UE, wherein the received UE-specific reference signal comprises the CSI-RS.

In some examples of the method, apparatus, and non-transitory computer-readable medium described above, identifying that the data for the UE may be available comprises: decoding the UE-specific reference signal using a C-RNTI for the UE.

Some examples of the method, apparatus, and non-transitory computer-readable medium described above may further include processes, features, means, or instructions for receiving at least a portion of the data from the base station in response to the transmitted signal.

Some examples of the method, apparatus, and non-transitory computer-readable medium described above may further include processes, features, means, or instructions for decoding at least one bit of the UE-specific reference signal to identify that the data may be available for the UE.

In some examples of the method, apparatus, and non-transitory computer-readable medium described above, the signal comprises a beam recovery signal.

DETAILED DESCRIPTION

Figure 1:
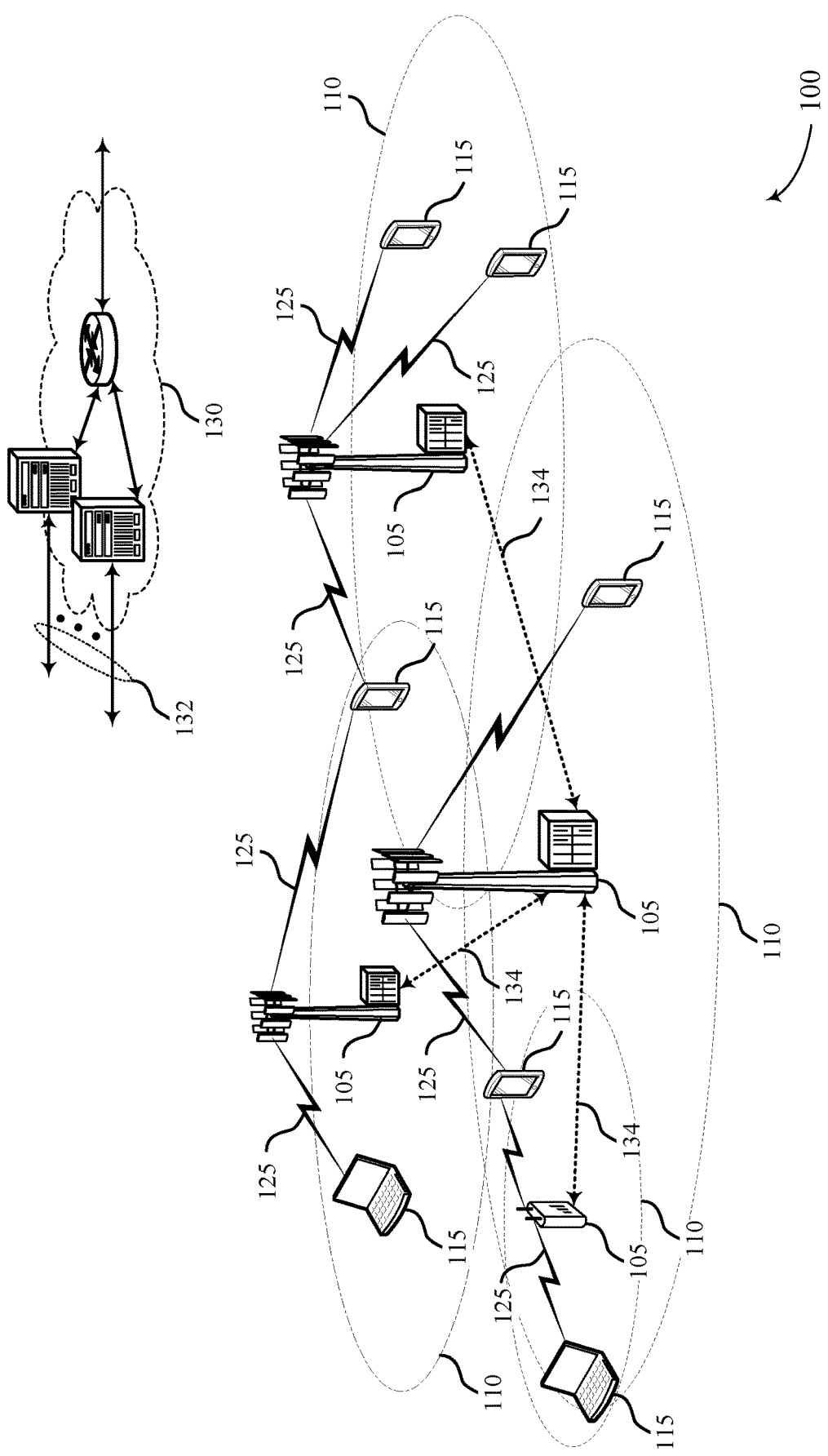
FIG. 1 illustrates an example of a system for wireless communication that supports a C-DRX wake up procedure in accordance with aspects of the present disclosure.

In some cases, a user equipment (UE) may monitor a wireless link continuously for an indication that the UE may receive data. In other cases (e.g., to conserve power and extend battery life) a UE may be configured with a discontinuous reception (DRX) cycle. A DRX cycle may consist of an active state (e.g., an On Duration) when the UE may monitor for control information (e.g., on a physical downlink control channel (PDCCH)) and a sleep state where the UE may power down some of all of its radio components. In some cases, a UE may be configured with a short DRX cycle and a long DRX cycle. In some cases, a UE may enter a long DRX cycle if it is inactive for one or more short DRX cycles.

In a millimeter wave (mmW) wireless communication system, the DRX process may be complicated by the fact that the a beam management may need to be performed between the UE and a mmW base station, e.g., a next generation nodeB (gNB). Beam management is a learning process and may include the gNB transmitting beam management beams to identify active beam(s) for communications between the UE and gNB (e.g., active transmit and receive beam at the gNB and/or the UE). In a DRX mode, the UE may move within the coverage area of the gNB while in the sleep state such that the active beam previously used for communications is no longer usable. Accordingly, the UE and/or gNB may be unsure which beam profile should be used for UE/gNB communications.

Aspects of the disclosure are initially described in the context of a wireless communications system. In some aspects, a gNB may use a plurality of UE-specific reference signals to convey an indication that data is available for the UE. The reference signals may be UE-specific in that they may be encoded using some or all of an identifier of the UE (e.g., a cell radio temporary network identifier (C-RNTI)). Thus, a base station may determine that data is available for the UE and that the UE is operating in a DRX mode (e.g., a C-DRX mode). The UE may configure and transmit a plurality of UE-specific reference signals using the UE identifier. The base station may transmit the UE-specific reference signals to the UE in a beam sweeping manner such that each UE-specific reference signal is transmitted in a different direction during the beam sweep. The base station may configure the reference signals to be UE-specific by using the UE identifier to modulate the reference signals. The UE may receive and demodulate the UE-specific reference signals using the UE identifier. If the modulation is successful (e.g., can only be successful if the reference signals were modulated using that UE's identifier), the UE will determine that data is available for the UE and respond by transmitting a beam recovery signal. The beam recovery signal may indicate the best base station transmit beam (e.g., a beam index) from the plurality of UE-specific transmit beams, e.g., the UE-specific transmit beam having the highest receive power level.

Aspects of the disclosure are further illustrated by and described with reference to apparatus diagrams, system diagrams, and flowcharts that relate to a C-DRX wake up procedure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

DRX cycles may be configured in the downlink so that the UE 115 does not have to decode the PDCCH or receive PDSCH transmissions in certain subframes. In some cases, a UE 115 may monitor a communication link 125 continuously for an indication that the UE 115 may receive data. In other cases (e.g., to conserve power and extend battery life) a UE 115 may be configured to operating according to a DRX mode, which may include a DRX cycle. A DRX cycle consists of an On Duration when the UE 115 may monitor for control information (e.g., on PDCCH) and a DRX period (or sleep state) when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

In some aspects, a base station 105 may identify that data is available to be transmitted to a UE 115 that is operating in a DRX mode. The base station 105 may configure a plurality of UE-specific reference signals for transmission to the UE, each UE-specific reference signal indicating a UE identifier and an availability of data for the UE. The UE 115 may receive the UE-specific reference signal, and identify that data is available for the UE from the base station 105. The UE 115 may then transmit a beam recovery signal to the base station that includes an identifier for the transmit beam used by the UE to transmit the beam recovery signal. The base station 105 may transmit, using a beam sweeping configuration, the plurality of UE-specific reference signals.

Figure 2:
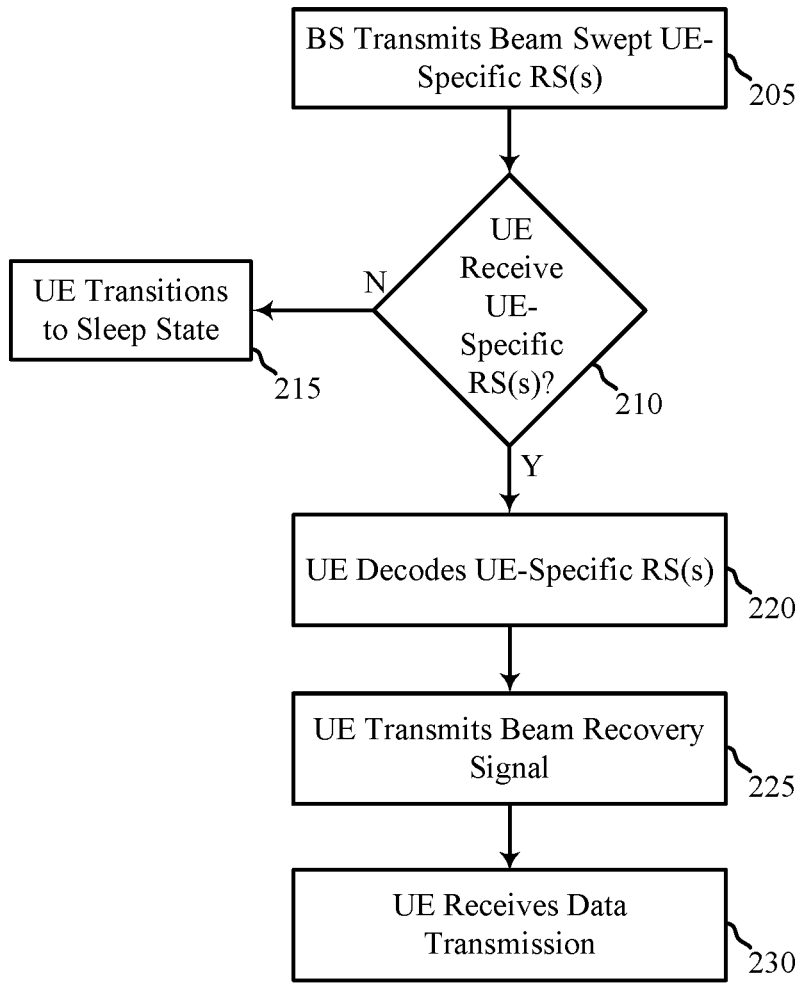
FIG. 2 illustrates an example of a method that supports a C-DRX wake up procedure in accordance with aspects of the present disclosure.

FIG. 2 illustrates an example of a method 200 that supports a C-DRX wake up procedure in accordance with various aspects of the present disclosure. In some examples, method 200 may implement aspects of wireless communications system 100. Aspects of method 200 may be implemented by a UE and/or a base station (e.g., gNB), which may be an examples of the corresponding devices described herein.

At 205, the base station may transmit beam swept UE-specific reference signals to the UE. For example, the base station may determine that it has data available for transmission to the UE. The base station may also determine that the UE is operating in a DRX mode and, based on the DRX mode, when the UE is scheduled to transition to the active state.

Based on the data being available for the UE, the base station may configure UE-specific reference signals to be transmitted to the UE. Configuring the UE-specific reference signals may include the base station encoding (e.g., scrambling) the UE-specific reference signals using some or all of the C-RNTI of the UE, e.g., the UE identifier. In some aspects, configuring the UE-specific reference signals may include configuring a bit in the reference signals to indicate that data is available for the UE, e.g., one or two bits that convey the indication. For example, the plurality of UE-specific reference signals may explicitly use an ON/OFF bit to indicate whether data is available for the UE. In some aspects, the plurality of UE-specific reference signals may contain a UE identifier (e.g., C-RNTI), but may not use the ON/OFF bit. In this example, the base station transmitting the plurality of UE-specific reference signals conveys the indication (e.g., implicitly) that data is available for the UE. When the base station determines that there is no data available for the UE, the base station may refrain from transmitting the UE-specific references signals. Accordingly, the UE may determine that when no UE-specific reference signals are received, that the base station does not have data available for the UE.

The base station may transmit the UE-specific reference signals to the UE using a beam sweeping configuration. for example, the base station may be a mmW base station (e.g., a gNB) that communicates using directional or beamformed transmissions. Each beamformed transmission may have an associated beamforming configuration associated with the transmit direction of the beam, the beam width, the beam shape, the beam angle of departure, the beam elevation, and the like. A beam sweeping configuration may include the base station transmitting the plurality of UE-specific reference signals in different directions to ensure coverage of a portion or all of the coverage area of the base station. For example, the base station may transmit a first UE-specific reference signal in a first direction, a second UE-specific reference signal in a second direction, and so on. In some aspects, the base station may transmit the UE-specific reference signals in every available direction. In other aspects, the base station may transmit the UE-specific reference signals in a subset of directions, e.g., based on a last known location of the UE.

At 210, the UE may determine whether it received any UE-specific reference signals. For example, the UE may be operating in a DRX mode that includes the UE temporarily transitions to an active state (or On Duration) to monitor for an indication that there is data available for the UE. In some aspects, the UE may monitor reference signals to determine if there is data available. If no indication was received from the base station (e.g., the UE did not receive any UE-specific reference signals or did not successfully decode the UE-specific reference signals) while the UE was in the active state, at 215 the UE may transition back to the sleep state and continue operating in the DRX mode. If the base station does have data available for the UE and the UE does receive the UE-specific reference signal(s) while in the active state, at 220 the UE decodes the UE-specific reference signal(s).

In some aspects, the UE may decode the UE-specific reference signal to identify that there is data available for the UE from the base station. For example, the UE may decode the UE-specific reference signals (e.g., CSI-RS) using some or all of the UE identifier (e.g., the C-RNTI of the UE). In some aspects, the UE may decode the UE-specific reference signals to identify one or more bits that indicate that the data is available for the UE.

At 225, the UE may transmit a signal, e.g., a beam recover signal (or message), to the base station. The beam recovery signal may be transmitted in response to the UE receiving one or more of the UE-specific reference signals. In some aspects, the beam recovery signal may be configured to carry or otherwise convey an indication of the transmit beam most suited for communicating with the base station, e.g., the beam index of the transmit beam identified from the UE-specific reference signal(s). In some aspects, the beam recovery signal may carry information indicating multiple beam indexes from the UE-specific reference signal(s), with each beam index having an associated receive power level, receive interference level, and the like. Accordingly, the UE may transmit an indication of the preferred base station transmit beam and/or an indication of the performance of each transmit beam used during the beam management transmission(s).

In other aspects, the beam recovery signal may carry or otherwise convey an indication of a UE transmit beam (e.g., an identifier or beam index) that the UE used to transmit the beam recovery signal. For example, the UE may cycle through different receive beam configurations during receipt of the plurality of UE-specific reference signals to identify a best receive beam configuration. Based on the best receive beam configuration, the UE may select a transmit beam configuration for the UE to use for transmitting the beam recovery signal. The beam recovery signal may include an identifier or index of the UE transmit beam. The base station may receive the UE transmit beam identifier and use this information to select a base station transmit beam. For example, based on the transmit direction, beam configuration, etc., of the UE transmit beam, the base station may determine a best base station transmit beam suited for communications with the UE. The best base station transmit beam may include a transmit beam configuration that provides the transmitted signal to the UE with the highest receive power level, highest receive quality, with the lowest interference, with the lowest transmit power level (e.g., while ensuring receipt), or the like.

Thus, in some aspects the base station may use the beam recovery signal to select and/or identify a transmit beam for the base station to use for transmitting the data to the UE and/or the transmit beam that the UE used to transit the beam recovery signal.

At 230, the UE may receive the data transmission from the base station. For example, the base station may, based on the beam recovery signal, transmit the data to the UE using a transmit beam selected based on the beam recovery signal. In some aspects, the base station may identify the beam index (or multiple beam indices) carried in the beam recovery signal and select the transmit beam to use for transmitting the data based on this information. In some examples, the data transmission may be transmitted using a PDSCH. In some case, the PDSCH may transmitted using beam sweeping. In other example, the PDCCH may be transmitted using beam sweeping, and the PDSCH does not use beam sweeping.

In some cases, each of the reference signals may contain one or more SS bursts (or SS blocks), channel state information reference signal (CSI-RS) bursts, or both. Each of the bursts may have a configurable periodicity (e.g., 5, 10, 20, 40, 80, 160 ms). The SS bursts may be independent of the channel bandwidth and contain one or more PSS symbols, SSS symbols, and PBCH symbols. For example, a single SS burst may contain one PSS symbol, one SSS symbol, and two PBCH symbols containing demodulation reference signal (DMRS) sequences. In some examples, multiple symbols may be used to train receive beams during a beam training procedure. For example the SSS symbol plus two PBCH symbols may train three receive beams. In other examples, other combinations of a PSS, SSS, and PBCHs, may be used to training multiple receive beams.

In other cases, each of the reference signals may contain one or more SS bursts with a subsequent beam-swept paging transmission distinct from CSI-RS transmission and quasi co-located (QCLed) with the antenna resources of the one or more SS bursts. A quasi co-location relationship between one or more beam transmissions may refer to a spatial relationship between the antenna ports (and the corresponding signaling beams) of the respective transmissions. For example, one or more antenna ports may be implemented by a base station for transmitting at least one or more reference signals and command information transmissions (e.g., C-RNTI) to a UE. However, the channel properties of the signals sent via the different antenna ports may be interpreted to be the same (e.g., despite the signals being transmitting from different antenna ports), and the antenna ports (and the respective beams) may be determined to be QCLed. In such cases, the UE may have respective antenna ports to emit receive beams used for receiving the QCLed transmissions (e.g., reference signal, C-RNTI). The SS bursts may contain one or more PSS, SSS, and PBCH symbols, and the PBCH symbol may contain DMRS sequences. A base station may configure the paging transmission such that the transmission is multiplexed with one or more SS bursts or schedule the paging transmission as subsequent indication following a SS burst transmission. In some cases, a base station may provide an indication of the paging information via DCI or a non-scheduled physical channel. For example, a base station may transmit a single SS burst containing each of a single SSS symbol, PSS symbol, and two PBCH symbols containing DMRS sequences. A base station may provide subsequent reference signaling to a UE via paging indication via beam-swept transmission. The paging signaling may be QCLed with the set of transmit beams corresponding to the preceding SS burst.

Figure 3:
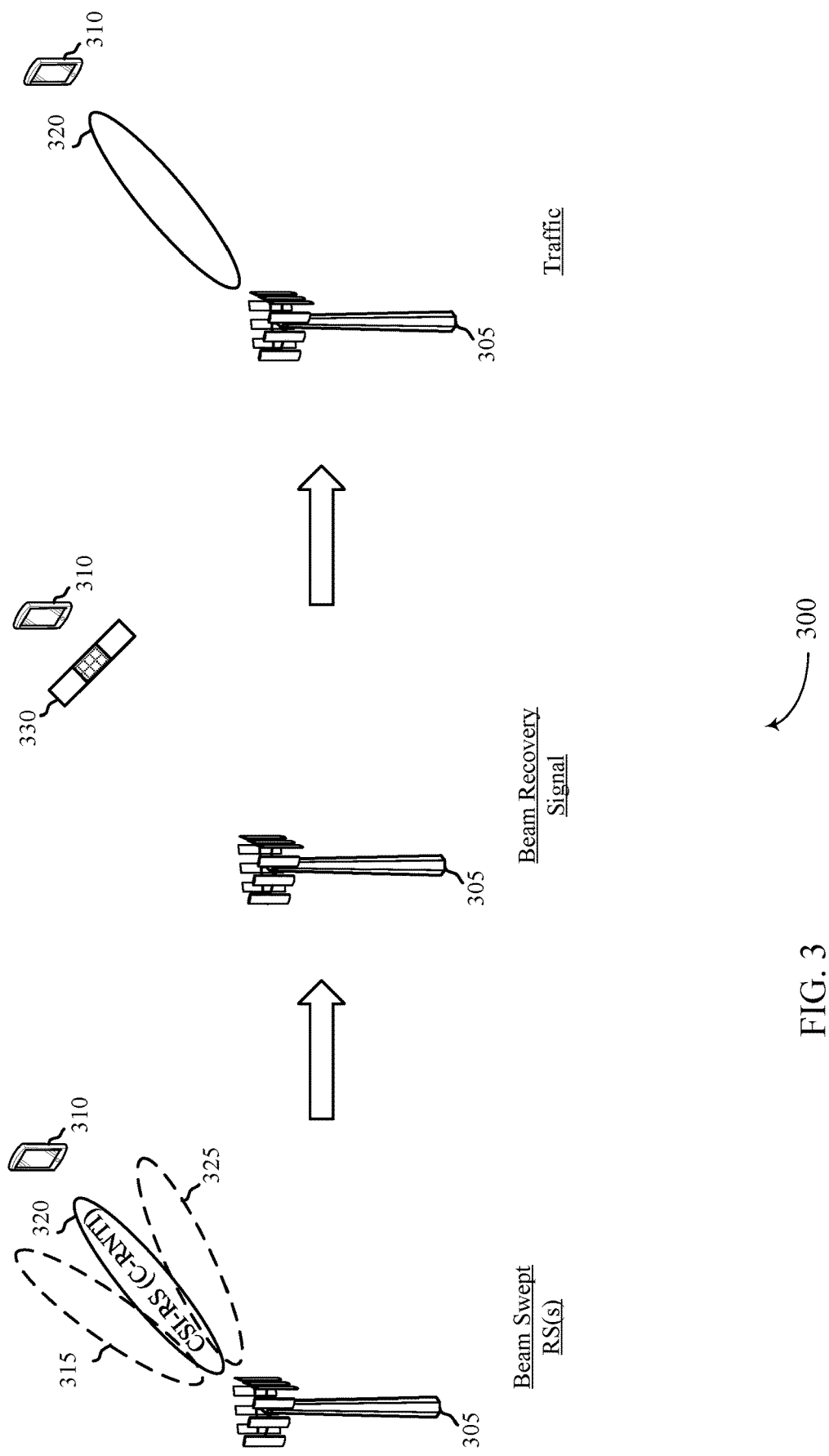
FIG. 3 illustrates an example of a system for wireless communication that supports a C-DRX wake up procedure in accordance with aspects of the present disclosure.

FIG. 3 illustrates an example of a system for wireless communications system 300 that supports a C-DRX wake up procedure in accordance with various aspects of the present disclosure. In some examples, system for wireless communications system 300 may implement aspects of wireless communications system 100 and/or method 200. Wireless communications system 300 may include a base station 305 and a UE 310, which may be examples of the corresponding devices described herein.

Initially, the base station 305 may determine that it has data available for UE 310. The base station 305 may determine that the UE 310 is operating in a DRX mode (e.g., a C-DRX mode) and, according to the DRX mode, when the UE 310 will be monitoring for an indication that the data is available. Accordingly, the base station 305 may configure and transmit a plurality of UE-specific reference signals to the UE 310. For example, the base station 305 may transmit a first UE-specific reference signal 315, a second UE-specific reference signal 320, and a third UE-specific reference signal 325. The UE-specific reference signals may be transmitted according to a beam sweeping configuration such that each UE-specific reference signal is transmitted in a different direction. Each UE-specific reference signal may have an associated beam index or identifier, such that the beam index or identifier indicates the direction that the UE-specific reference signal was transmitted in. In some aspects, the UE-specific reference signal may be a CSI-RS that is modulated using some of all of the C-RNTI of the UE 310.

In some aspects, the UE 310 may receive some or all of the plurality of UE-specific reference signals and cycle through different receive beam configurations to identify a UE receive beam. The UE receive beam may be associated with the receive beam configuration that received a UE-specific reference signal with the highest receive power level, with the lowest interference level, and the like. The UE may identify the transmit beam index of the UE-specific reference signal that was received using the UE receive beam.

Next, the UE 310 may transmit a beam recovery signal 330 to the base station 305 based on the received UE-specific reference signal(s). In some aspects, the beam recovery signal 330 may carry or otherwise convey an indication of the best base station 305 transmit beam (e.g., UE-specific reference signal 320). In some aspects, the beam recovery message may also carry other performance metrics for the other UE-specific reference signals (e.g., UE-specific reference signals 315 and 325). The beam recovery message may explicitly identify the UE-specific reference signal 320 as the best base station 305 transmit beam or may simply indicate the performance metrics associated with each UE-specific reference signal.

In some aspects, the base station 305 may use the beam recovery signal 330 to identify a beam index for the transmit beam that the UE 310 used to transmit the beam recovery signal and/or to select a transmit beam of the base station 305 for the base station 305 to use to use to transmit the data to the UE 310.

Next, the base station 305 may receive the beam recovery signal 330 and respond by scheduling and transmitting the data to the UE 310 using a transmit beam 320, e.g., the best base station 305 transmit beam.

Figure 4:
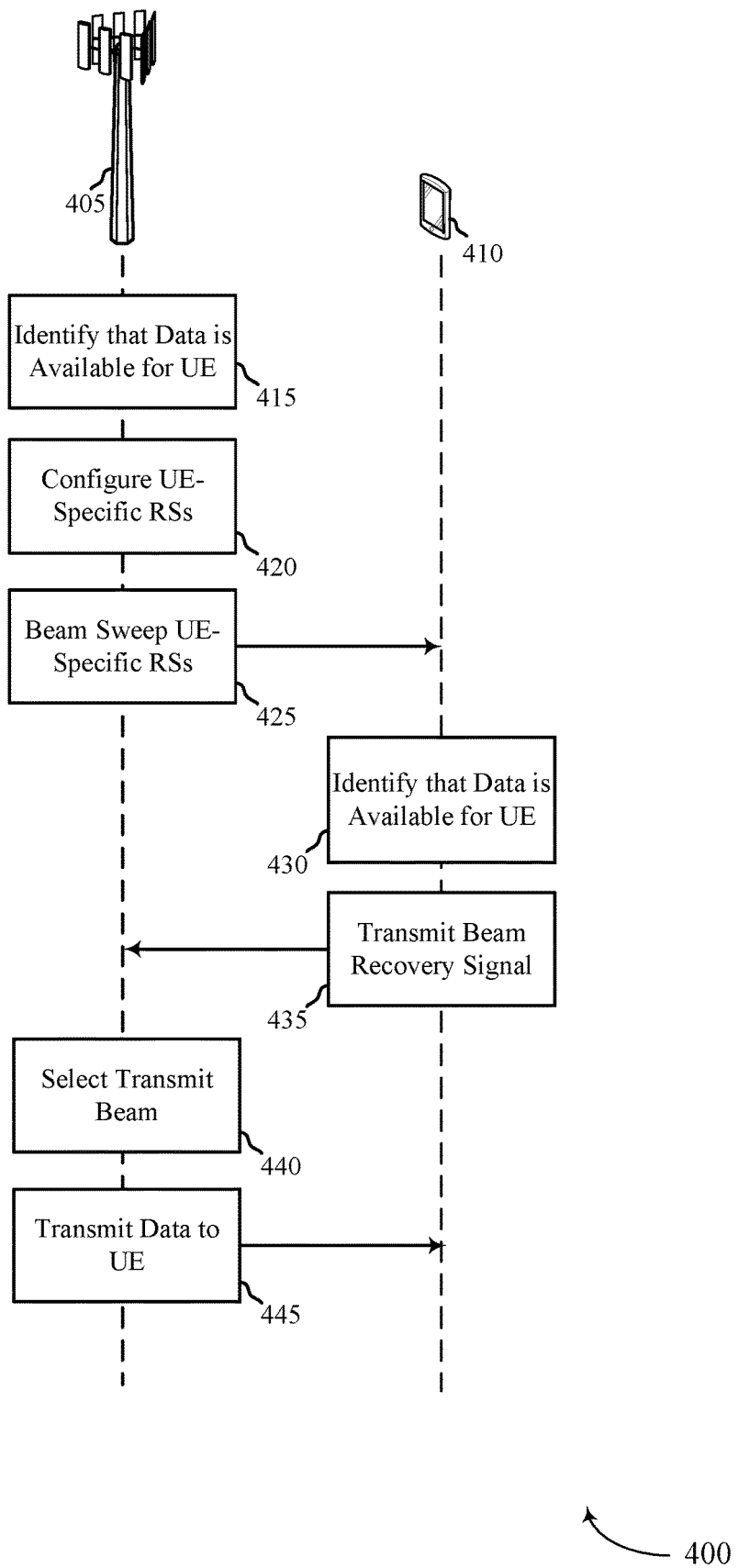
FIG. 4 illustrates an example of a process that supports a C-DRX wake up procedure in accordance with aspects of the present disclosure.

FIG. 4 illustrates an example of a process 400 that supports a C-DRX wake up procedure in accordance with various aspects of the present disclosure. In some examples, process 400 may implement aspects of wireless communications systems 100 and/or 300, as well as method 200. process 400 may include a base station 405 and a UE 410, which may be examples of the corresponding devices described herein.

At 415, the base station 405 may identify that data is available for the UE 410. The UE 410 may be operating in a DRX mode, e.g., a C-DRX mode. The DRX mode may include the UE 410 switching or otherwise transitioning between an active state and a sleep state.

At 420, the base station 405 may configure a plurality of UE-specific reference signals (RSs) for the UE 410. The plurality of UE-specific reference signals may carry or otherwise convey an indication of a UE identifier. In some aspects, the base station 405 may encode a plurality of CSI-RSs with some or all of the UE identifier. In some aspects, the base station 405 may encode the plurality of UE-specific reference signals with some or all of a C-RNTI of the UE 410. In some aspects, the base station 405 may configure a bit in the plurality of UE-specific reference signals to indicate that the data is available for transmission to the UE 410. For example, the plurality of UE-specific reference signals may explicitly use an ON/OFF bit to indicate whether data is available for the UE.

At 425, the base station 405 may transmit (and the UE 410 may receive at least one of) the plurality of UE-specific reference signals to the UE 410 using a beam sweeping configuration. In some aspects, the beam sweeping configuration may include the base station 405 transmitting each UE-specific reference signal in a different beamforming direction.

At 430, the UE 410 may identify that data is available for the UE 410 based on receiving at least one of the plurality of UE-specific reference signals. The UE 410 may identify that data is available based on receiving one (or more) of the UE-specific reference signals beam swept to the UE 410.

In some aspects, the UE 410 may identify the available data by decoding a CSI-RS using at least a portion of the UE identifier, e.g., the UE-specific reference signal may be the CSI-RS. In some aspects, the UE 410 may use the C-RNTI to decode the UE-specific reference signals to identify that data is available. In some aspects, the UE 410 may decode one or more bits in the UE-specific reference signals to identify that data is available.

At 435, the UE 410 may transmit a beam recovery signal to the base station 405 in response to the data being available. The beam recovery signal may include an identifier of the transmit beam used by the UE 410 to transmit the beam recovery signal. The beam recovery signal may include an identifier of the transmit beam used to transmit the at least one UE-specific reference signal that has the highest receive power, highest receive quality, the lowest interference level, or the like. In some aspects, the identifier may include a beam index of the indicated beam.

At 440, the base station 405 may select a transmit beam to use to transmit the data to the UE 410 based on the received beam recovery signal. In some aspects, the base station 405 may identify a beam index for a transmit beam used by the UE 410 to transmit the beam recovery signal.

At 445, the base station 405 may transmit (and the UE 410 may receive) the identified data to the UE 410 using the selected transmit beam.

Figure 5:
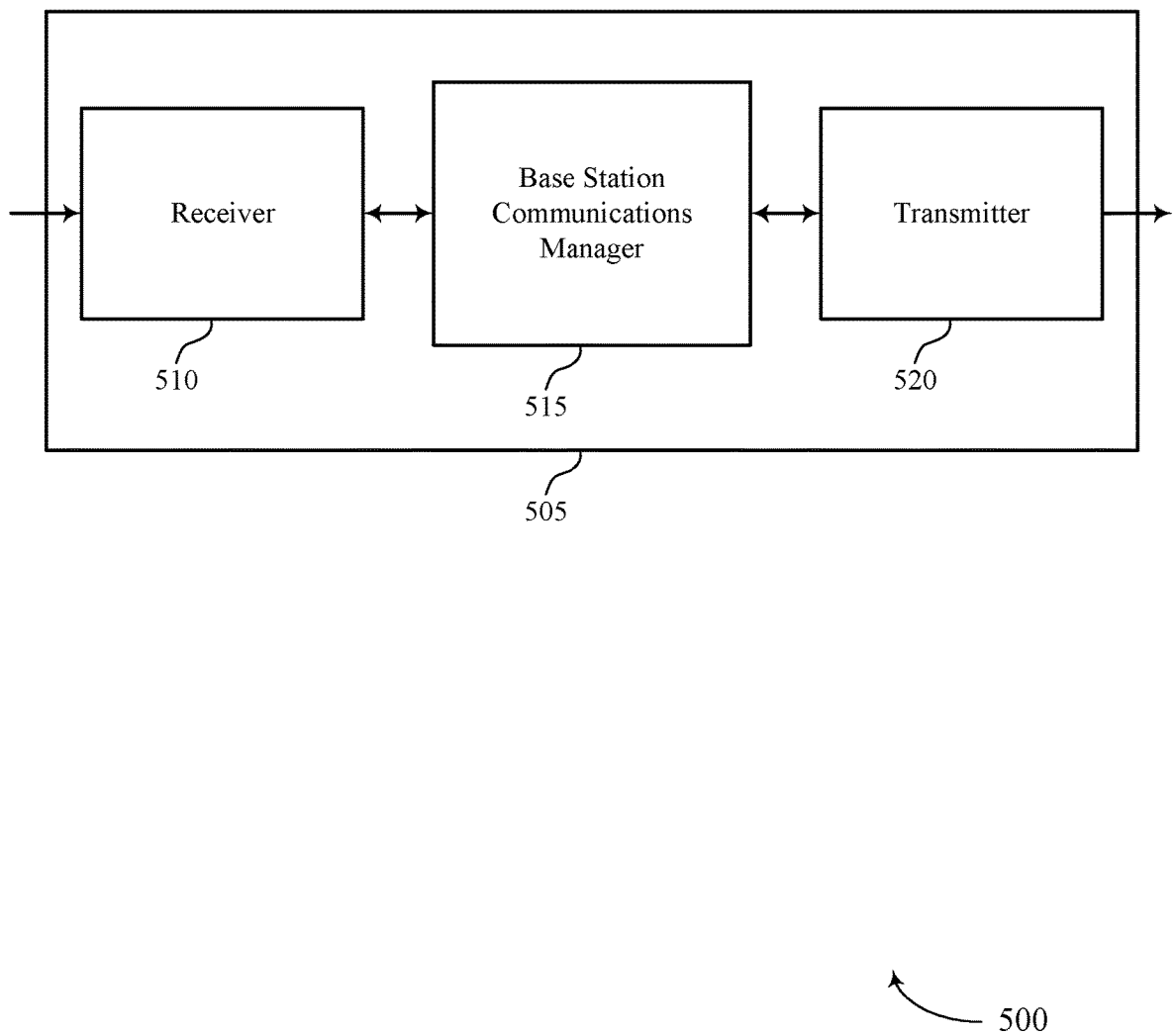
FIGS. 5 through 7 show block diagrams of a device that supports a C-DRX wake up procedure in accordance with aspects of the present disclosure.

FIG. 5 shows a block diagram 500 of a wireless device 505 that supports a C-DRX wake up procedure in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to a C-DRX wake up procedure, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify that data is available to be transmitted to a UE that is operating in a DRX mode, configure a set of UE-specific reference signals for transmission to the UE, each UE-specific reference signal indicating a UE identifier and an availability of data for the UE, and transmit, using a beam sweeping configuration, the set of UE-specific reference signals.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
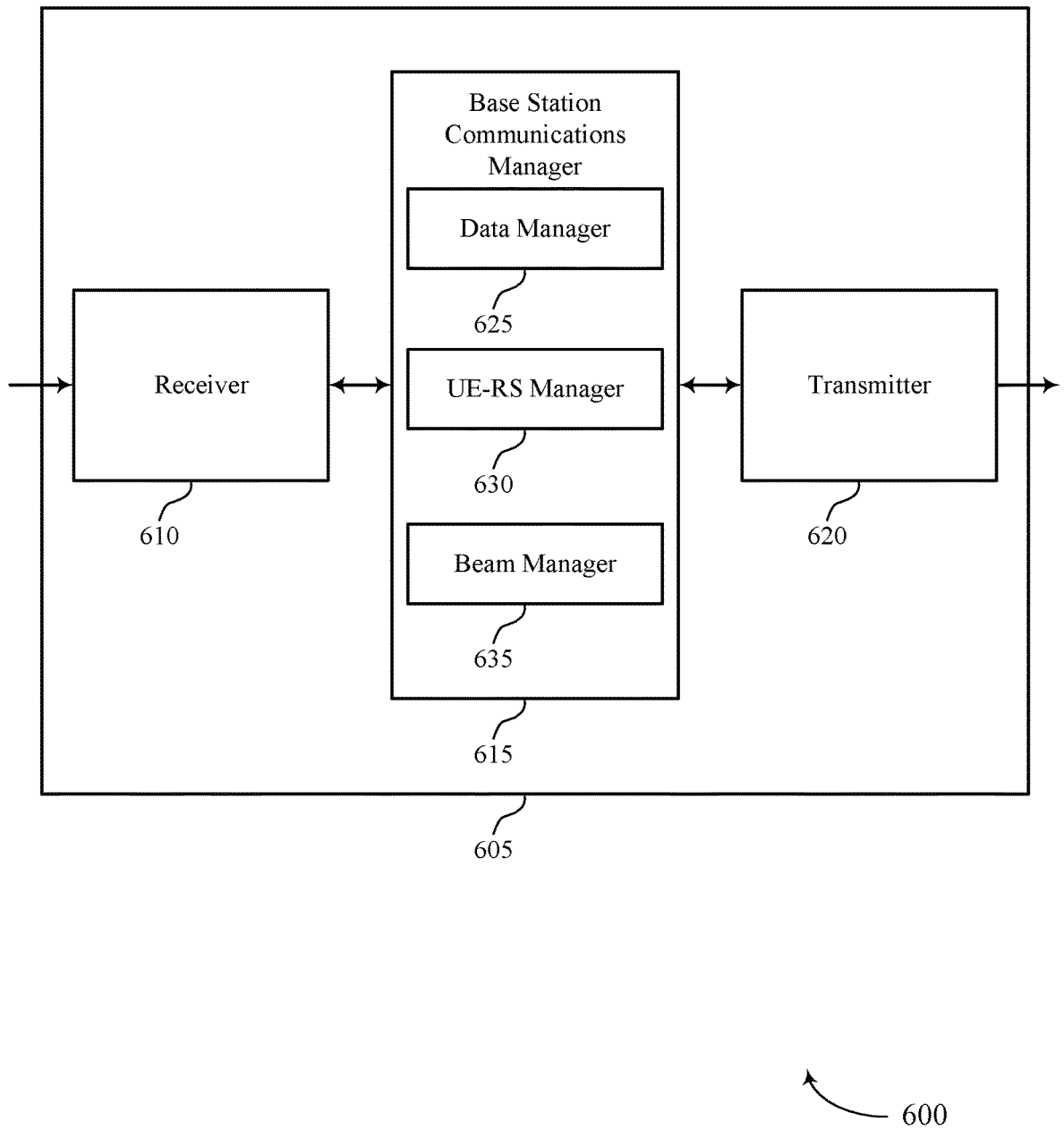

FIG. 6 shows a block diagram 600 of a wireless device 605 that supports a C-DRX wake up procedure in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to a C-DRX wake up procedure, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include data manager 625, UE-RS manager 630, and beam manager 635.

Data manager 625 may identify that data is available to be transmitted to a UE that is operating in a DRX mode.

UE-RS manager 630 may configure a set of UE-specific reference signals for transmission to the UE, each UE-specific reference signal indicating a UE identifier and an availability of data for the UE. In some cases, configuring the set of UE-specific reference signals for transmission to the UE includes: encoding a set of CSI-RSs with at least a portion of the UE identifier. In some cases, configuring the set of UE-specific reference signals for transmission to the UE includes: encoding the set of UE-specific reference signals with at least a portion of a C-RNTI for the UE. In some cases, transmitting the plurality of UE-specific reference signals conveys the indication of availability of data for the UE.

Beam manager 635 may transmit, using a beam sweeping configuration, the set of UE-specific reference signals and receive a beam recovery signal from the UE in response to the set of UE-specific reference signals. In some cases, the beam sweeping configuration includes transmitting each UE-specific reference signal in a different beamforming direction.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
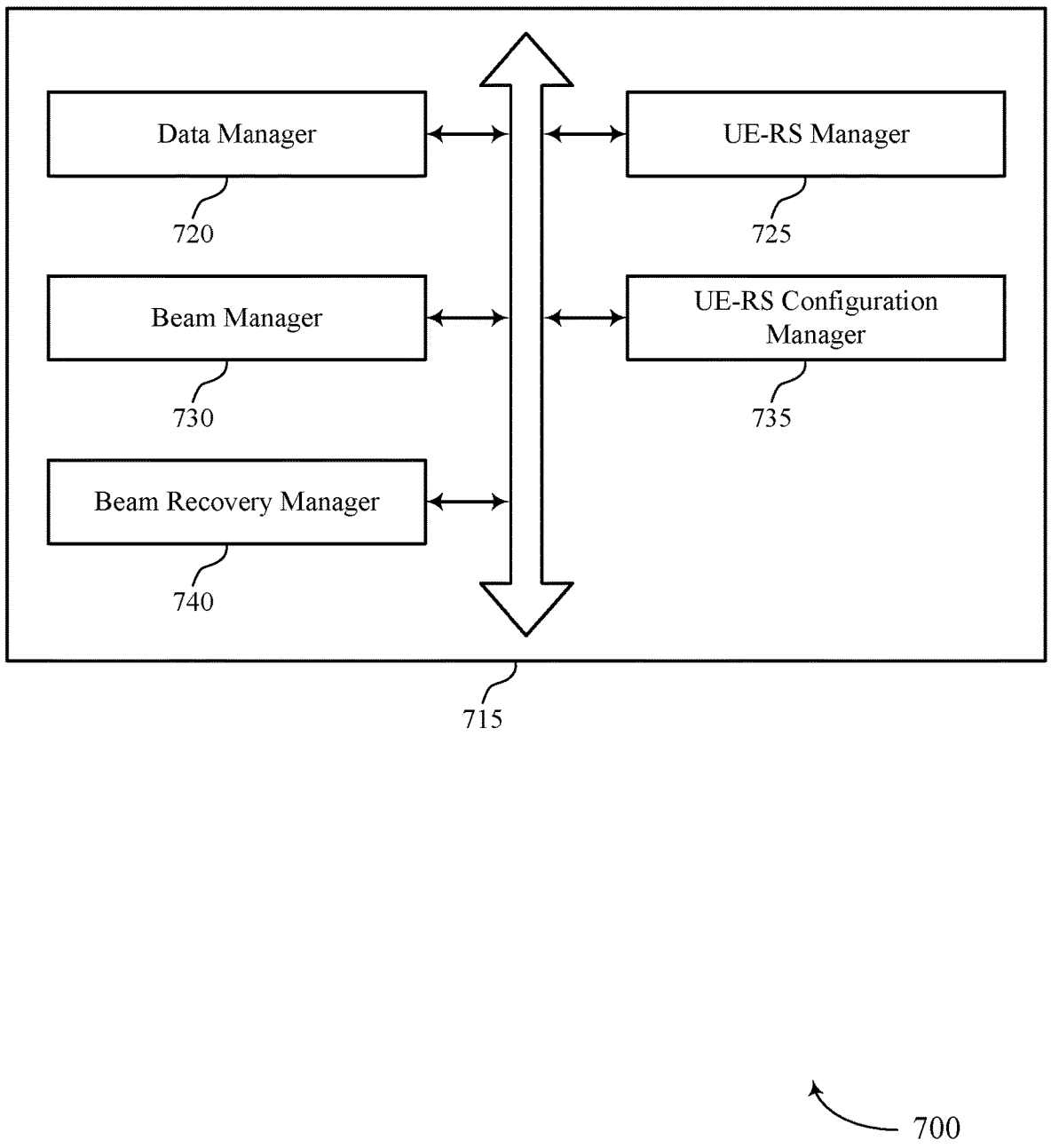

FIG. 7 shows a block diagram 700 of a base station communications manager 715 that supports a C-DRX wake up procedure in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include data manager 720, UE-RS manager 725, beam manager 730, UE-RS configuration manager 735, and beam recovery manager 740. Each of these modules may communicate, directly or indirectly, with one another (e.g., via one or more buses).

Data manager 720 may identify that data is available to be transmitted to a UE that is operating in a DRX mode.

UE-RS manager 725 may configure a set of UE-specific reference signals for transmission to the UE, each UE-specific reference signal indicating a UE identifier and an availability of data for the UE. In some cases, configuring the set of UE-specific reference signals for transmission to the UE includes: encoding a set of CSI-RSs with at least a portion of the UE identifier. In some cases, configuring the set of UE-specific reference signals for transmission to the UE includes: encoding the set of UE-specific reference signals with at least a portion of a C-RNTI for the UE. In some cases, transmitting the plurality of UE-specific reference signals conveys the indication of availability of data for the UE.

Beam manager 730 may transmit, using a beam sweeping configuration, the set of UE-specific reference signals and receive a beam recovery signal from the UE in response to the set of UE-specific reference signals. In some cases, the beam sweeping configuration includes transmitting each UE-specific reference signal in a different beamforming direction.

UE-RS configuration manager 735 may configure a bit in the set of UE-specific reference signals to indicate that the data is available for transmission to the UE.

Beam recovery manager 740 may receive a beam recovery signal from the UE in response to the set of UE-specific reference signals, select a transmit beam to use to transmit the data to the UE based on the received beam recovery signal, identify a beam index for a transmit beam used by the UE to transmit the beam recovery signal, and transmit the data to the UE based on the identified beam index.

Figure 8:
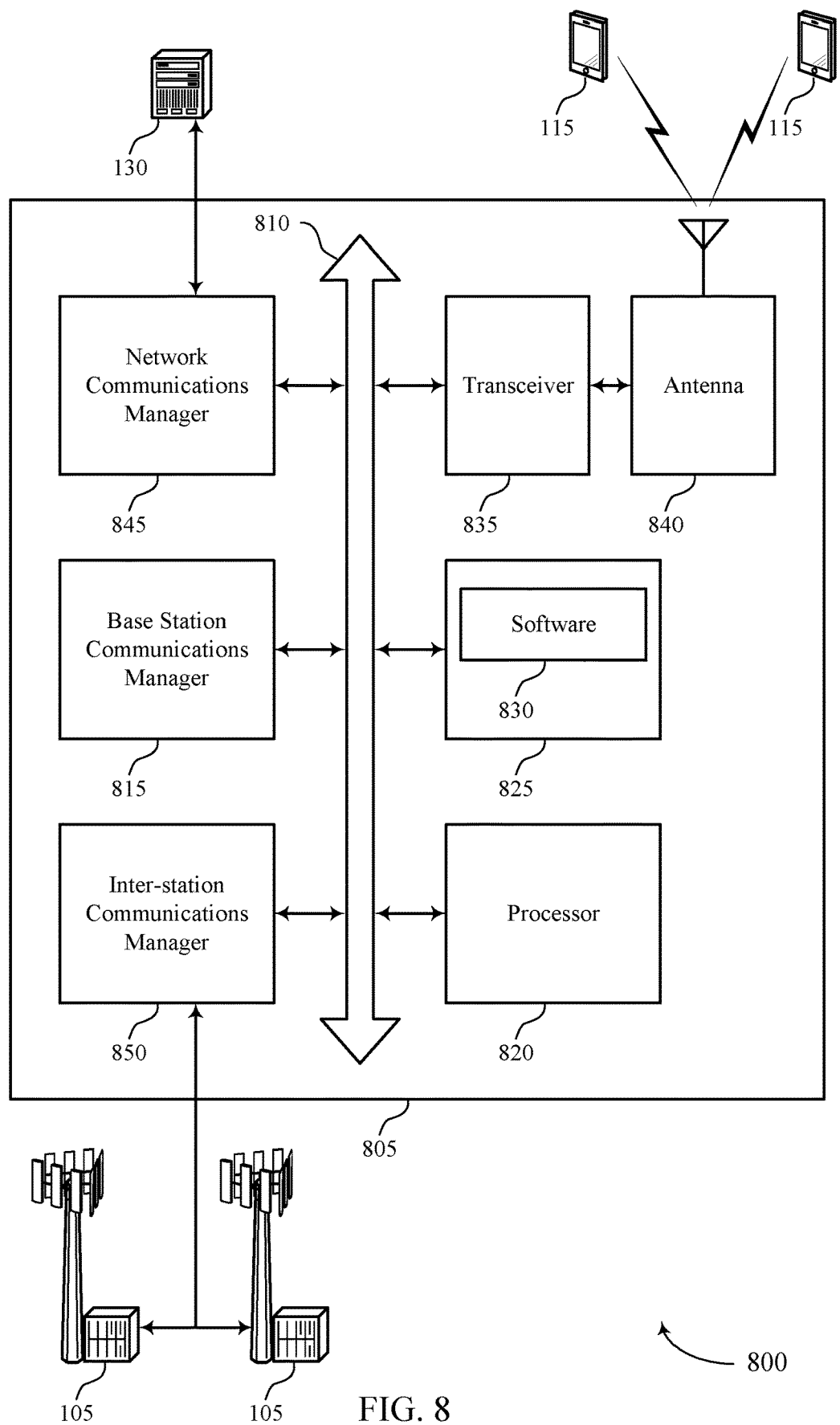
FIG. 8 illustrates a block diagram of a system including a base station that supports a C-DRX wake up procedure in accordance with aspects of the present disclosure.

FIG. 8 shows a diagram of a system 800 including a device 805 that supports a C-DRX wake up procedure in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting a C-DRX wake up procedure).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support a C-DRX wake up procedure. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
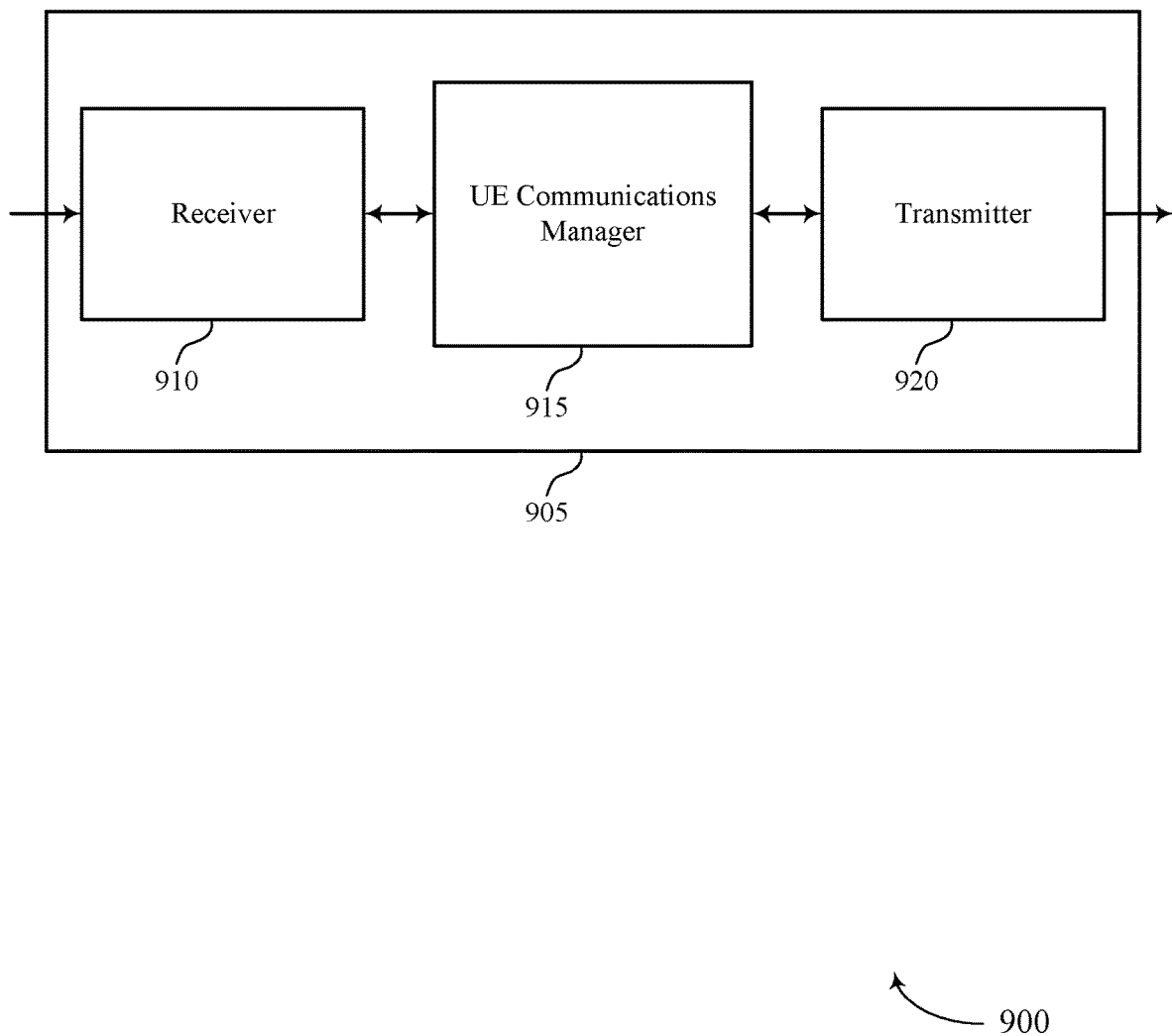
FIGS. 9 through 11 show block diagrams of a device that supports a C-DRX wake up procedure in accordance with aspects of the present disclosure.

FIG. 9 shows a block diagram 900 of a wireless device 905 that supports a C-DRX wake up procedure in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to a C-DRX wake up procedure, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, while operating in a DRX mode, a UE-specific reference signal from a base station, identify, based on the received UE-specific reference signal, that data for the UE is available from the base station, and transmit, based on the identification, a signal to the base station, the signal including a beam index.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
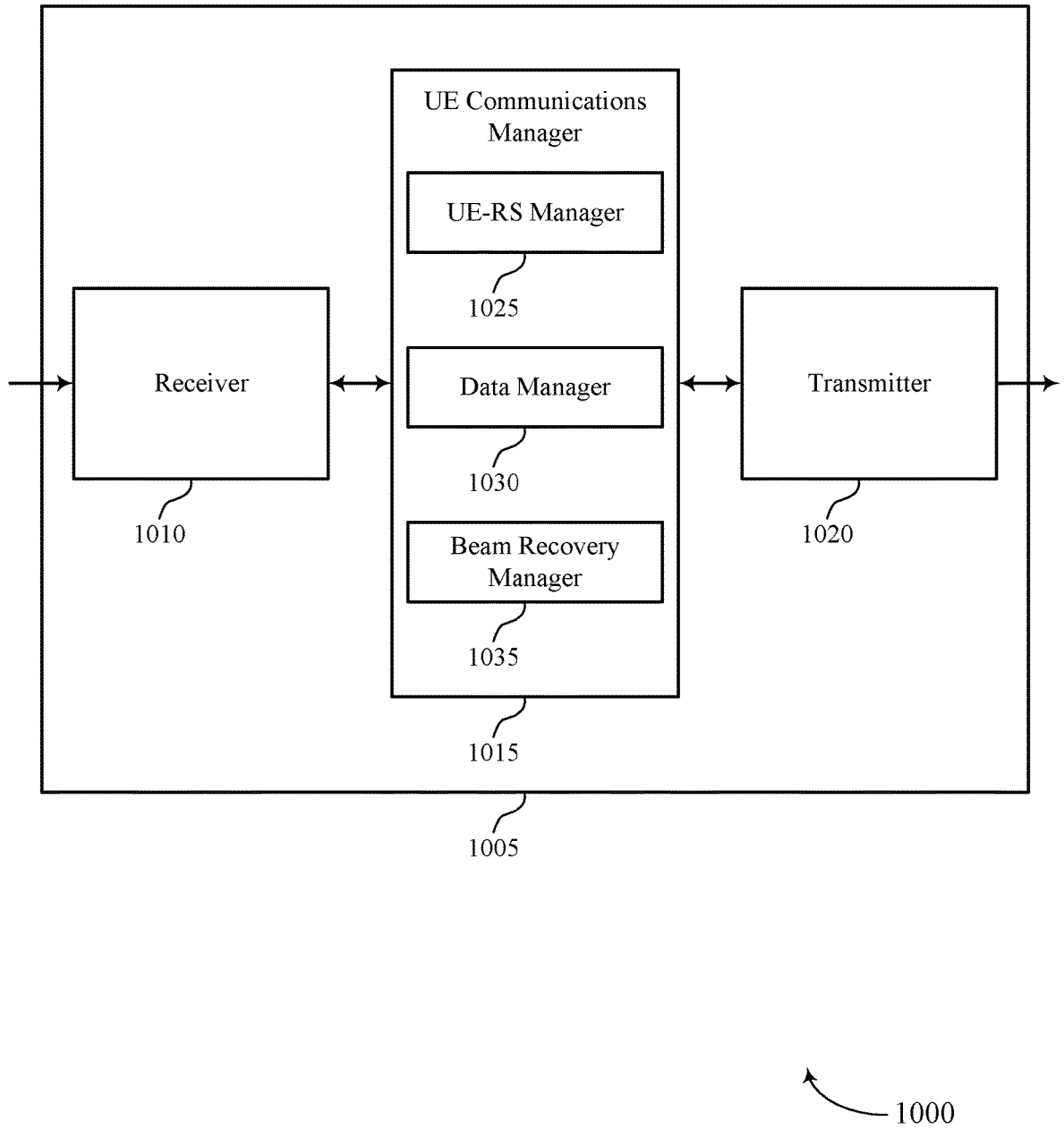

FIG. 10 shows a block diagram 1000 of a wireless device 1005 that supports a C-DRX wake up procedure in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to a C-DRX wake up procedure, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include UE-RS manager 1025, data manager 1030, and beam recovery manager 1035.

UE-RS manager 1025 may receive, while operating in a DRX mode, a UE-specific reference signal from a base station.

Data manager 1030 may identify, based on the received UE-specific reference signal, that data for the UE is available from the base station, receive at least a portion of the data from the base station in response to the transmitted beam recovery signal, and decode at least one bit of the UE-specific reference signal to identify that the data is available for the UE. In some cases, identifying that the data for the UE is available includes: decoding a channel state information reference signal (CSI-RS) using at least a portion of an identifier of the UE, where the received UE-specific reference signal includes the CSI-RS. In some cases, identifying that the data for the UE is available includes: decoding the UE-specific reference signal using a cell radio network temporary identifier (C-RNTI) for the UE. In some cases, transmitting the plurality of UE-specific reference signals conveys the indication of availability of data for the UE.

Beam recovery manager 1035 may transmit, based on the identification, a signal to the base station, the signal including a beam index.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
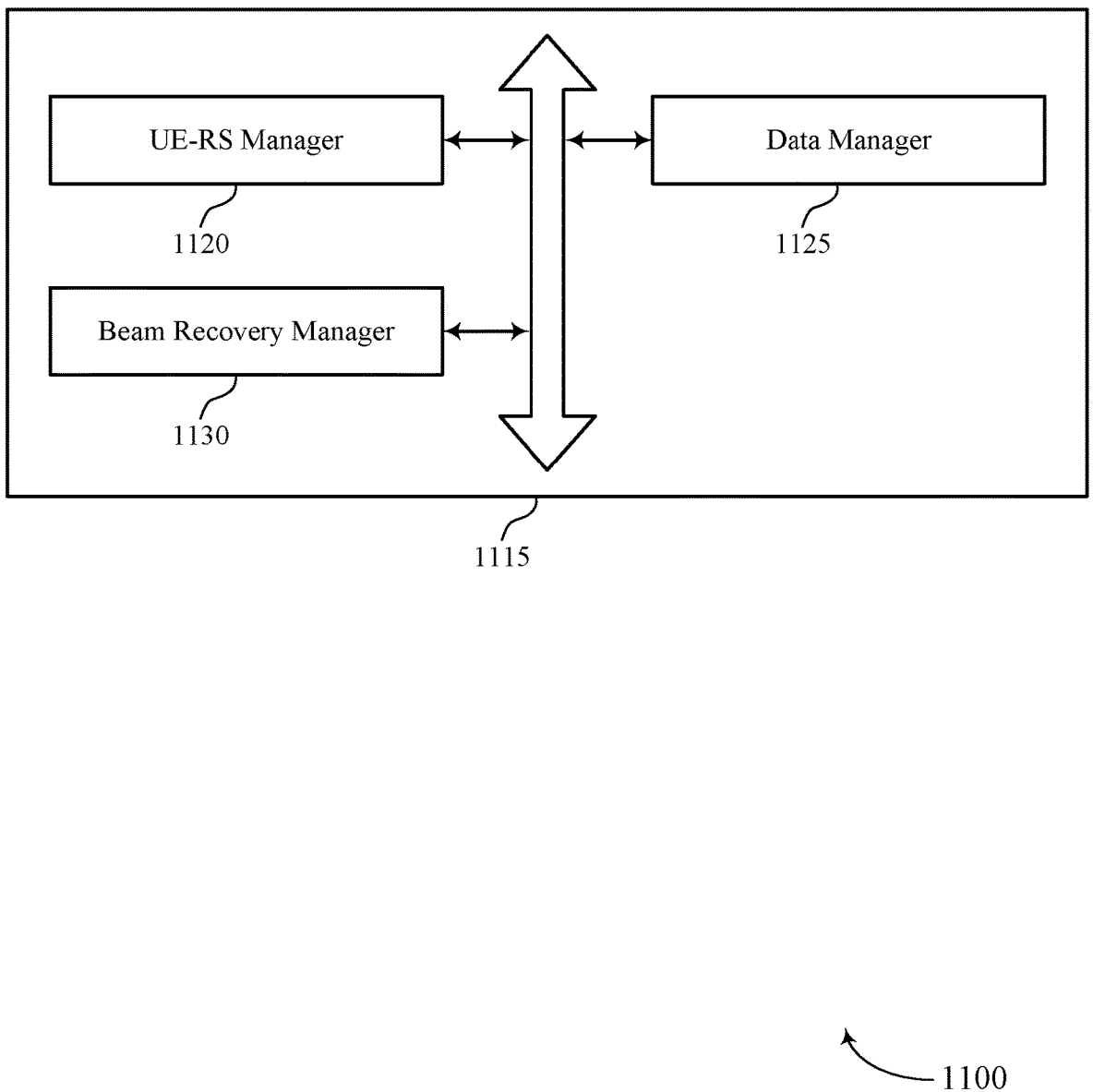

FIG. 11 shows a block diagram 1100 of a UE communications manager 1115 that supports a C-DRX wake up procedure in accordance with aspects of the present disclosure. The UE communications manager 1115 may be an example of aspects of a UE communications manager 1215 described with reference to FIGS. 9, 10, and 12. The UE communications manager 1115 may include UE-RS manager 1120, data manager 1125, and beam recovery manager 1130. Each of these modules may communicate, directly or indirectly, with one another (e.g., via one or more buses).

UE-RS manager 1120 may receive, while operating in a DRX mode, a UE-specific reference signal from a base station.

Data manager 1125 may identify, based on the received UE-specific reference signal, that data for the UE is available from the base station, receive at least a portion of the data from the base station in response to the transmitted beam recovery signal, and decode at least one bit of the UE-specific reference signal to identify that the data is available for the UE. In some cases, identifying that the data for the UE is available includes: decoding a channel state information reference signal (CSI-RS) using at least a portion of an identifier of the UE, where the received UE-specific reference signal includes the CSI-RS. In some cases, identifying that the data for the UE is available includes: decoding the UE-specific reference signal using a cell radio network temporary identifier (C-RNTI) for the UE. In some cases, transmitting the plurality of UE-specific reference signals conveys the indication of availability of data for the UE.

Beam recovery manager 1130 may transmit, based on the identification, a signal to the base station, the signal including a beam index. In some cases, the signal is a beam recovery signal.

Figure 12:
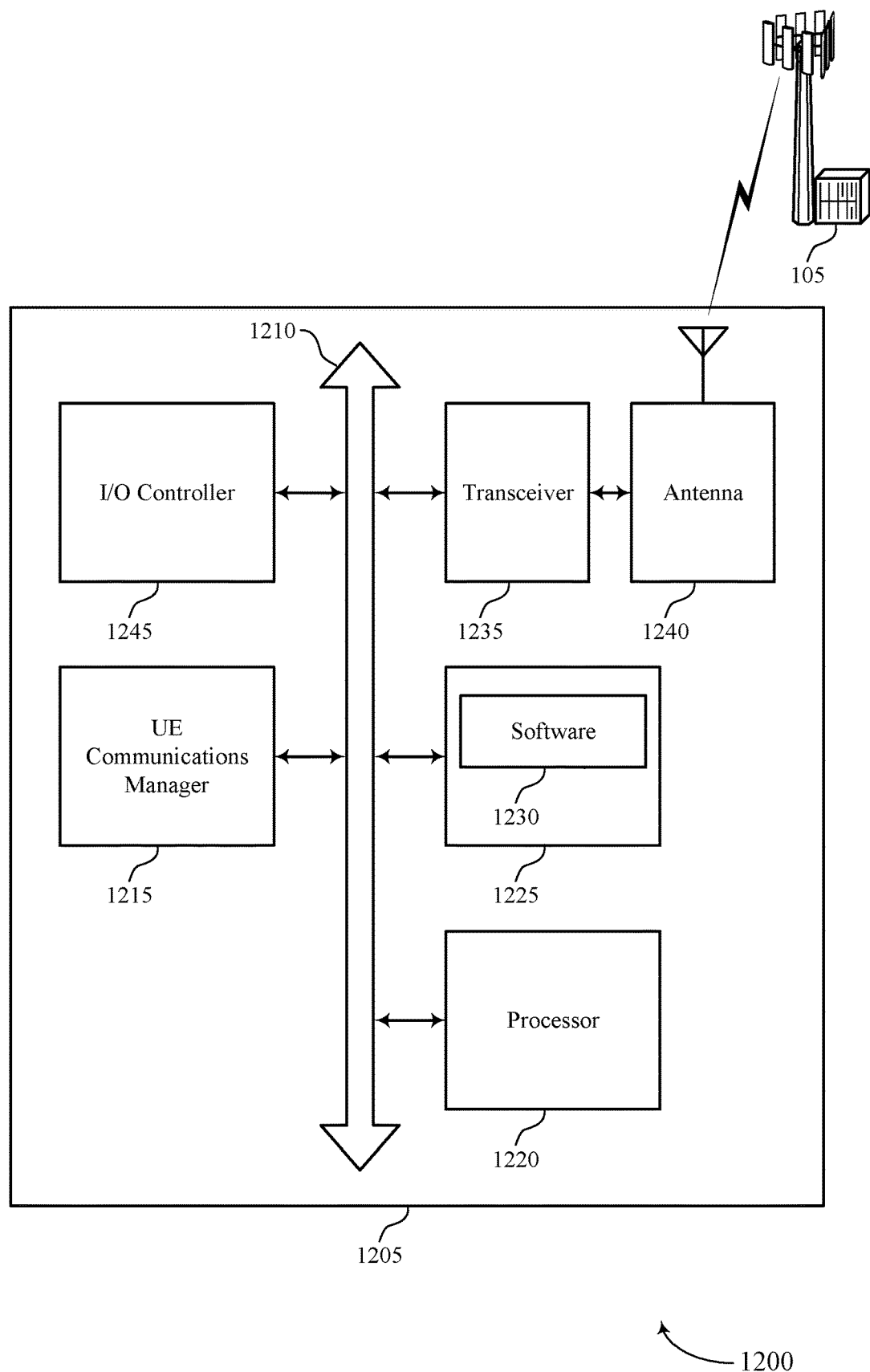
FIG. 12 illustrates a block diagram of a system including a UE that supports a C-DRX wake up procedure in accordance with aspects of the present disclosure.

FIG. 12 shows a diagram of a system 1200 including a device 1205 that supports a C-DRX wake up procedure in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting a C-DRX wake up procedure).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support a C-DRX wake up procedure. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
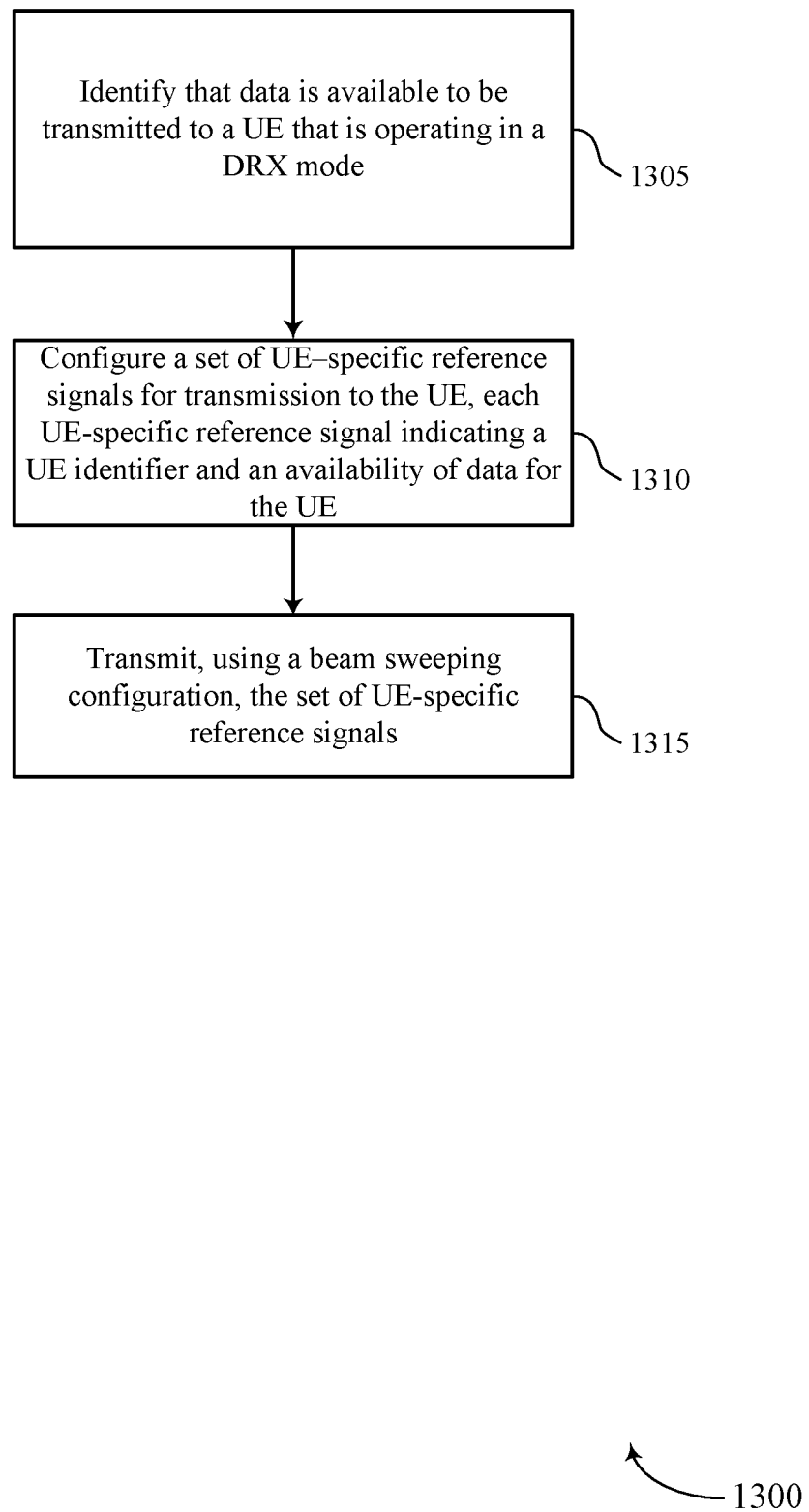
FIGS. 13 through 16 illustrate methods for a C-DRX wake up procedure in accordance with aspects of the present disclosure.

FIG. 13 shows a flowchart illustrating a method 1300 for a C-DRX wake up procedure in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify that data is available to be transmitted to a UE that is operating in a DRX mode. The operations of block 1305 may be performed according to the methods described herein. In certain examples, aspects of the operations of block 1305 may be performed by a data manager as described with reference to FIGS. 5 through 8.

At block 1310 the base station 105 may configure a plurality of UE-specific reference signals for transmission to the UE, each UE-specific reference signal indicating a UE identifier and an availability of data for the UE. The operations of block 1310 may be performed according to the methods described herein. In certain examples, aspects of the operations of block 1310 may be performed by a UE-RS manager as described with reference to FIGS. 5 through 8.

At block 1315 the base station 105 may transmit, using a beam sweeping configuration, the plurality of UE-specific reference signals. The operations of block 1315 may be performed according to the methods described herein. In certain examples, aspects of the operations of block 1315 may be performed by a beam manager as described with reference to FIGS. 5 through 8.

Figure 14:
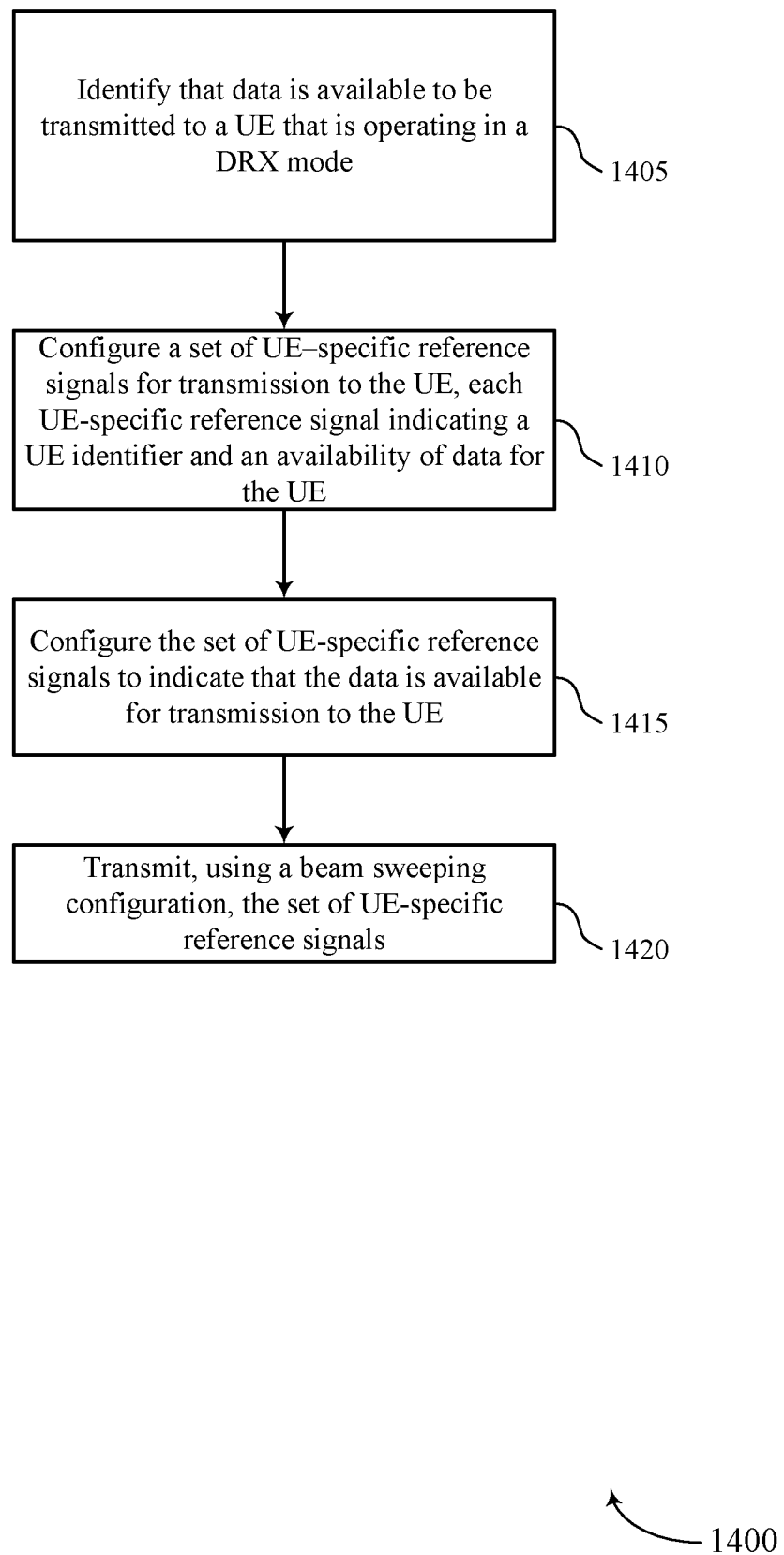

FIG. 14 shows a flowchart illustrating a method 1400 for a C-DRX wake up procedure in accordance with aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify that data is available to be transmitted to a UE that is operating in a DRX mode. The operations of block 1405 may be performed according to the methods described herein. In certain examples, aspects of the operations of block 1405 may be performed by a data manager as described with reference to FIGS. 5 through 8.

At block 1410 the base station 105 may configure a plurality of UE-specific reference signals for transmission to the UE, each UE-specific reference signal indicating a UE identifier and an availability of data for the UE. The operations of block 1410 may be performed according to the methods described herein. In certain examples, aspects of the operations of block 1410 may be performed by a UE-RS manager as described with reference to FIGS. 5 through 8.

At block 1415 the base station 105 may configure a bit in the plurality of UE-specific reference signals to indicate that the data is available for transmission to the UE. The operations of block 1415 may be performed according to the methods described herein. In certain examples, aspects of the operations of block 1415 may be performed by a UE-RS configuration manager as described with reference to FIGS. 5 through 8.

At block 1420 the base station 105 may transmit, using a beam sweeping configuration, the plurality of UE-specific reference signals. The operations of block 1420 may be performed according to the methods described herein. In certain examples, aspects of the operations of block 1420 may be performed by a beam manager as described with reference to FIGS. 5 through 8.

Figure 15:
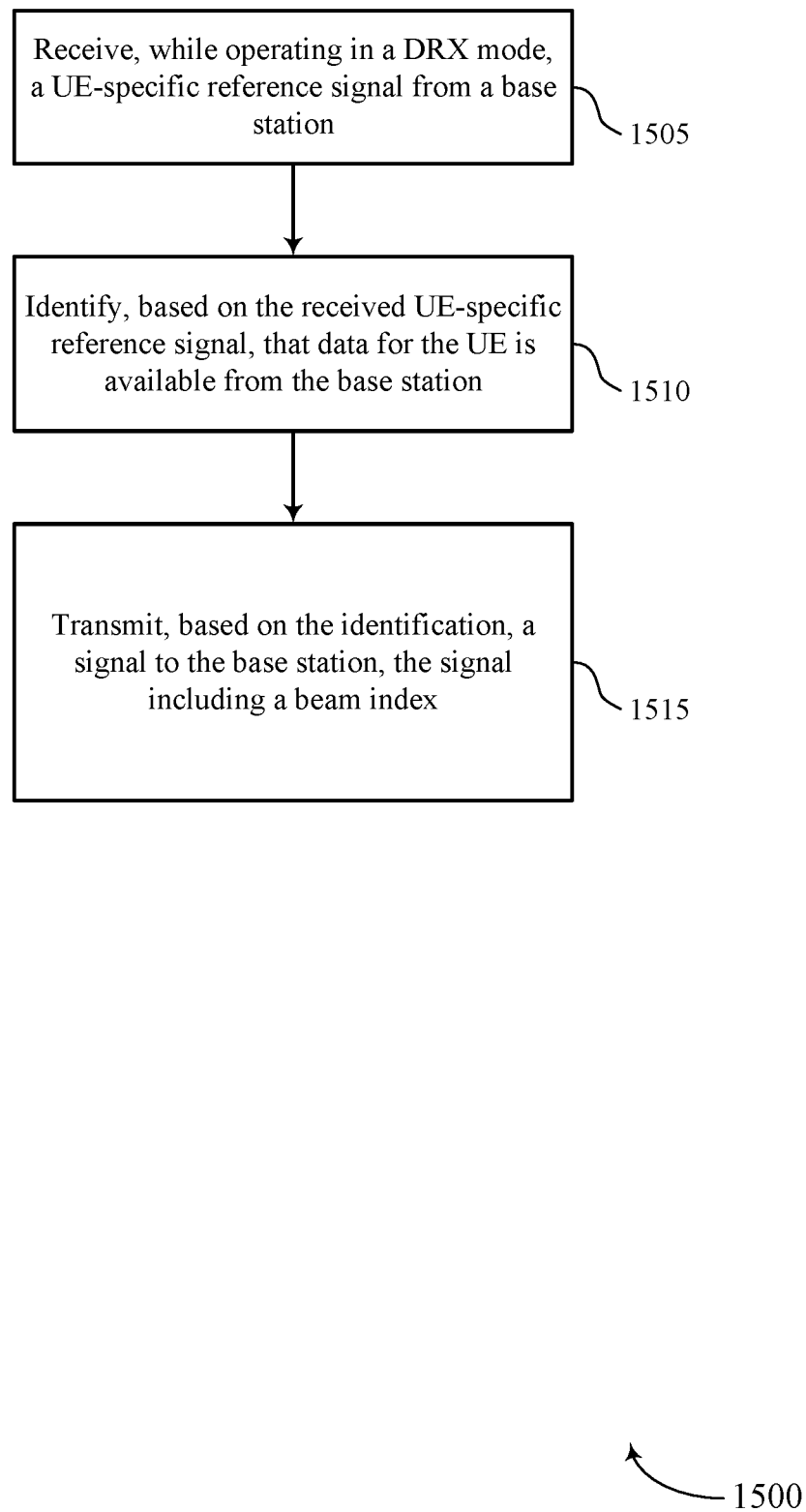

FIG. 15 shows a flowchart illustrating a method 1500 for a C-DRX wake up procedure in accordance with aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, while operating in a DRX mode, a UE-specific reference signal from a base station. The operations of block 1505 may be performed according to the methods described herein. In certain examples, aspects of the operations of block 1505 may be performed by a UE-RS manager as described with reference to FIGS. 9 through 12.

At block 1510 the UE 115 may identify, based at least in part on the received UE-specific reference signal, that data for the UE is available from the base station. The operations of block 1510 may be performed according to the methods described herein. In certain examples, aspects of the operations of block 1510 may be performed by a data manager as described with reference to FIGS. 9 through 12.

At block 1515 the UE 115 may transmit, based at least in part on the identification, a signal to the base station, the signal including a beam index. The operations of block 1515 may be performed according to the methods described herein. In certain examples, aspects of the operations of block 1515 may be performed by a beam recovery manager as described with reference to FIGS. 9 through 12.

Figure 16:
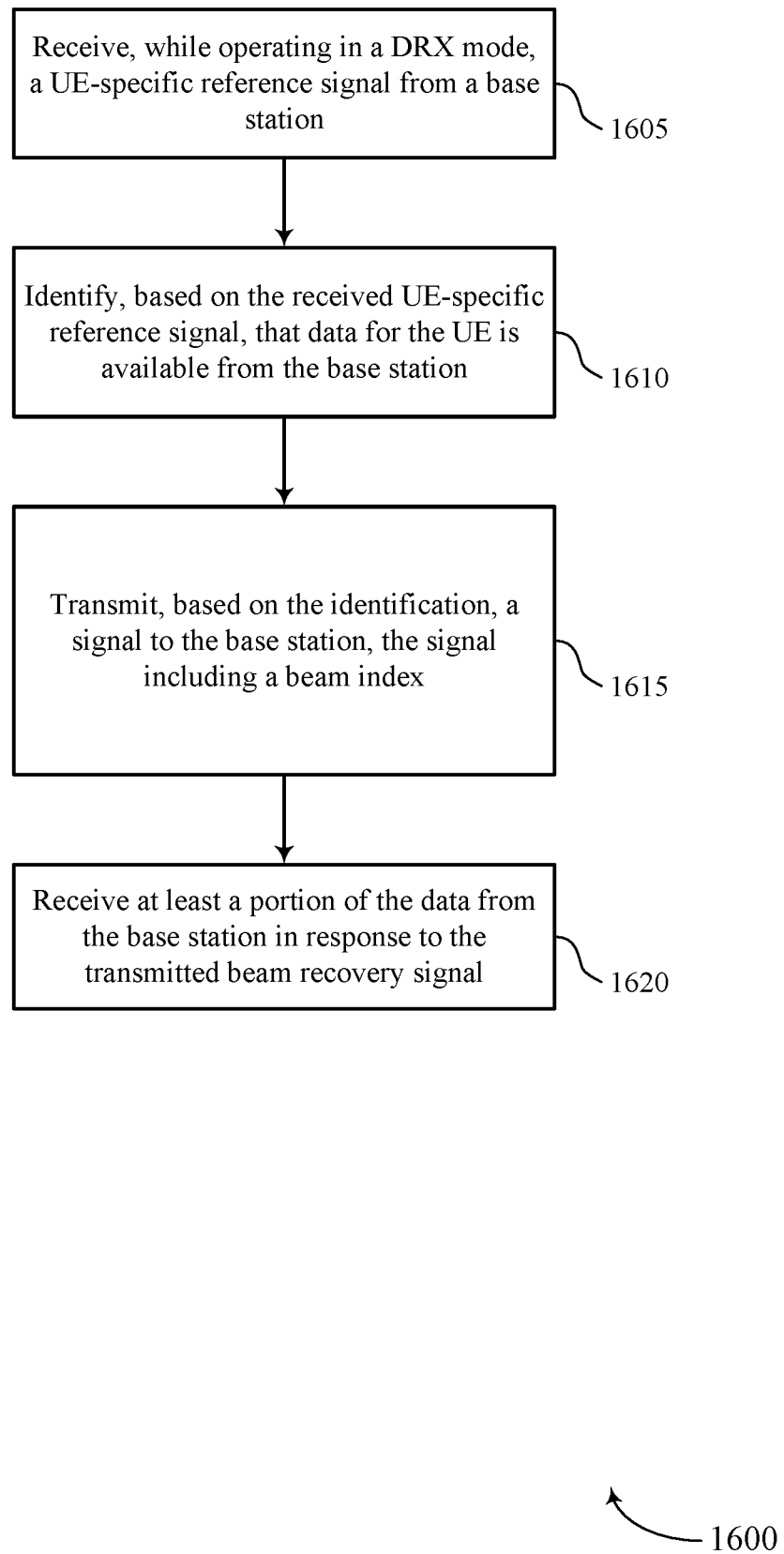

FIG. 16 shows a flowchart illustrating a method 1600 for a C-DRX wake up procedure in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, while operating in DRX mode, a UE-specific reference signal from a base station. The operations of block 1605 may be performed according to the methods described herein. In certain examples, aspects of the operations of block 1605 may be performed by a UE-RS manager as described with reference to FIGS. 9 through 12.

At block 1610 the UE 115 may identify, based at least in part on the received UE-specific reference signal, that data for the UE is available from the base station. The operations of block 1610 may be performed according to the methods described herein. In certain examples, aspects of the operations of block 1610 may be performed by a data manager as described with reference to FIGS. 9 through 12.

At block 1615 the UE 115 may transmit, based at least in part on the identification, a signal to the base station, the signal including a beam index. The operations of block 1615 may be performed according to the methods described herein. In certain examples, aspects of the operations of block 1615 may be performed by a beam recovery manager as described with reference to FIGS. 9 through 12.

At block 1620 the UE 115 may receive at least a portion of the data from the base station in response to the transmitted beam recovery signal. The operations of block 1620 may be performed according to the methods described herein. In certain examples, aspects of the operations of block 1620 may be performed by a data manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    identifying that data is available to be transmitted to a user equipment (UE) that is operating in a discontinuous reception (DRX) mode;
    configuring a plurality of UEspecific reference signals for transmission to the UE, each UE-specific reference signal indicating a UE identifier and an availability of data for the UE, the availability of data for the UE indicated by a bit configured in each of the plurality of UE-specific reference signals; and
    transmitting, using a beam sweeping configuration, the plurality of UE-specific reference signals.

2. The method of claim 1, wherein:
    configuring the plurality of UE-specific reference signals for transmission to the UE comprises encoding a plurality of channel state information reference signals (CSI-RSs) with at least a portion of the UE identifier.

3. The method of claim 1, wherein the UE identifier includes at least a portion of a cell radio network temporary identifier (C-RNTI) for the UE, and wherein:
    configuring the plurality of UE-specific reference signals for transmission to the UE comprises encoding the plurality of UE-specific reference signals with at least a portion of the cell radio network temporary identifier (C-RNTI) for the UE.

4. The method of claim 3, wherein:
    transmitting the plurality of UE-specific reference signals conveys the indication of availability of data for the UE.

5. The method of claim 1, further comprising:
    receiving a beam recovery signal from the UE in response to the plurality of UE-specific reference signals; and
    selecting a transmit beam to use to transmit the data to the UE based at least in part on the received beam recovery signal.

6. The method of claim 1, further comprising:
    receiving a beam recovery signal from the UE in response to the plurality of UE-specific reference signals; and
    identifying a beam index for a transmit beam used by the UE to transmit the beam recovery signal.

7. The method of claim 6, further comprising:
    transmitting the data to the UE based at least in part on the identified beam index.

8. The method of claim 1, wherein:
    the beam sweeping configuration comprises transmitting each UE-specific reference signal in a different beamforming direction, and further comprising:
    receiving a beam recovery signal from the UE, the beam recovery signal including an identifier of a transmit beam used by the base station to transmit the at least one UE-specific reference signal with the highest receive power, highest receive quality, lowest interference level, or a combination.

9. A method for wireless communication at a user equipment (UE), comprising:
    receiving, while operating in a discontinuous reception (DRX) mode, a UE-specific reference signal from a base station, wherein the UE-specific reference signal includes one bit encoded with at least a portion of a cell radio network temporary identifier (C-RNTI) for the UE, the one bit indicating that data is available for the UE or not available for the UE;
    identifying, based at least in part on the received UE-specific reference signal, that data for the UE is available from the base station, wherein the identifying comprises decoding the UE-specific reference signal using the at least a portion of the C-RNTI to identify that the data is available for the UE based on the one bit; and
    transmitting, based at least in part on the identification, a signal to the base station, the signal including a beam index.

10. The method of claim 9, wherein the plurality of UE-specific reference signals comprise a plurality of channel state information reference signals (CSI-RSs), and wherein:
    identifying that the data for the UE is available comprises decoding at least one channel state information reference signal (CSI-RS) using the UE identifier, wherein the UE identifier is at least a portion of a cell radio network temporary identifier (C-RNTI) for the UE.

11. The method of claim 9, wherein the UE identifier is at least a portion of a cell radio network temporary identifier (C-RNTI) for the UE, and wherein:
    identifying that the data for the UE is available comprises decoding the UE-specific reference signal using a cell radio network temporary identifier (C-RNTI) for the UE.

12. The method of claim 9, further comprising:
    receiving at least a portion of the data from the base station in response to the transmitted signal.

13. The method of claim 9, wherein:
    the signal comprises a beam recovery signal.

14. An apparatus for wireless communication at a base station, comprising:
- a processor,
- memory in electronic communication with the processor; and
- instructions stored in the memory and executable by the processor to cause the apparatus to:
  - identify that data is available to be transmitted to a user equipment (UE) that is operating in a discontinuous reception (DRX) mode;
  - configure a plurality of UE-specific reference signals for transmission to the UE, each UE-specific reference signal indicating a UE identifier and an availability of data for the UE, the availability of data for the UE indicated by a bit configured in each of the plurality of UE-specific reference signals; and
  - transmit, using a beam sweeping configuration, the plurality of UE-specific reference signals.

15. The apparatus of claim 14, wherein the instructions to configure the plurality of UE-specific reference signals for transmission to the UE are executable by the processor to cause the apparatus to:
- encode a plurality of channel state information reference signals (CSI-RSs) with at least a portion of the UE identifier.

16. The apparatus of claim 14, wherein the UE identifier is at least a portion of a cell radio network temporary identifier (C-RNTI) for the UE, and wherein the instructions to configure the plurality of UE-specific reference signals for transmission to the UE are executable by the processor to cause the apparatus to:
- encode the plurality of UE-specific reference signals with at least a portion of the cell radio network temporary identifier (C-RNTI) for the UE.

17. The apparatus of claim 16, wherein:
- transmitting the plurality of UE-specific reference signals conveys the indication of availability of data for the UE.

18. The apparatus of claim 14, wherein the instructions are further executable by the processor to cause the apparatus to:
- receive a beam recovery signal from the UE in response to the plurality of UE-specific reference signals; and
- select a transmit beam to use to transmit the data to the UE based at least in part on the received beam recovery signal.

19. The apparatus of claim 14, wherein the instructions are further executable by the processor to cause the apparatus to:
- receive a beam recovery signal from the UE in response to the plurality of UE-specific reference signals; and
- identify a beam index for a transmit beam used by the UE to transmit the beam recovery signal.

20. The apparatus of claim 19, wherein the instructions are further executable by the processor to cause the apparatus to:
- transmit the data to the UE based at least in part on the identified beam index.

21. The apparatus of claim 14, wherein:
- the beam sweeping configuration comprises transmitting each UE-specific reference signal in a different beamforming direction.

22. An apparatus for wireless communication at a user equipment (UE), comprising:
- a processor,
- memory in electronic communication with the processor; and
- instructions stored in the memory and executable by the processor to cause the apparatus to:
  - receive, while operating in a discontinuous reception (DRX) mode, a UE-specific reference signal from a base station;
  - identify, based at least in part on the received UE-specific reference signal, that data for the UE is available from the base station, the instructions to identify including instructions to decode at least one bit of the UE-specific reference signal to identify that the data is available for the UE; and
  - transmit, based at least in part on the identification, a signal to the base station, the signal including a beam index.

23. The apparatus of claim 22, wherein the UE-specific reference signal is a channel state information reference signal (CSI-RS), and wherein the instructions to identify that the data for the UE is available are executable by the processor to cause the apparatus to:
- decode the channel state information reference signal (CSI-RS) using at least a portion of an identifier of the UE, wherein the received UE-specific reference signal.

24. The apparatus of claim 22, wherein the UE-specific reference signal includes an indication that data for the UE is available from the base station encoded in the UE-specific reference signal, and wherein the instructions to identify that the data for the UE is available are executable by the processor to cause the apparatus to:
- decode the UE-specific reference signal using a cell radio network temporary identifier (C-RNTI) for the UE.

25. The apparatus of claim 22, wherein the instructions are further executable by the processor to cause the apparatus to:
- receive at least a portion of the data from the base station in response to the transmitted signal.

26. The apparatus of claim 22, wherein:
- the signal comprises a beam recovery signal.

* * * * *